United States Patent [19]  
Kosel

[11] 3,991,226  
[45] *Nov. 9, 1976

[54] METHOD OF CREATING AN IMAGE USING HYBRID LIQUID TONERS

[75] Inventor: George E. Kosel, Park Ridge, N.J.

[73] Assignee: Philip A. Hunt Chemical Corporation, Palisades Park, N.J.

[ * ] Notice: The portion of the term of this patent subsequent to Aug. 7, 1990, has been disclaimed.

[22] Filed: Jan. 14, 1974

[21] Appl. No.: 433,251

Related U.S. Application Data

[63] Continuation of Ser. No. 163,502, July 16, 1971, abandoned.

[52] U.S. Cl. .......................... 427/17; 252/62.1 L; 427/15
[51] Int. Cl.² ........................................ G03G 13/10
[58] Field of Search ............. 252/62.1 L; 117/17.5; 427/15, 17

[56] References Cited  
UNITED STATES PATENTS

| | | | |
|---|---|---|---|
| 3,198,759 | 8/1965 | Schmidle et al. | 260/22 |
| 3,232,903 | 2/1966 | Schmidle et al. | 260/33.6 |
| 3,241,998 | 3/1966 | Oliphant | 252/62.1 L |
| 3,317,635 | 5/1967 | Osmond et al. | 260/881 |
| 3,417,019 | 12/1968 | Beyer | 252/62.1 |
| 3,585,140 | 6/1971 | Machida et al. | 252/62.1 |
| 3,629,117 | 12/1971 | Okuno et al. | 252/62.1 |
| 3,639,243 | 2/1972 | Okuno et al. | 252/62.1 |
| 3,639,244 | 2/1972 | Machida et al. | 252/62.1 |
| 3,669,886 | 6/1972 | Kosel | 252/62.1 L |
| 3,753,760 | 8/1973 | Kosel | 252/62.1 L |
| 3,788,995 | 11/1974 | Stahly et al. | 252/62.1 |

FOREIGN PATENTS OR APPLICATIONS

| | | | |
|---|---|---|---|
| 941,395 | 11/1963 | United Kingdom | 260/881 |
| 971,885 | 10/1964 | United Kingdom | 260/881 |
| 992,635 | 5/1965 | United Kingdom | 260/881 |
| 1,009,004 | 11/1965 | United Kingdom | 260/881 |

*Primary Examiner*—Ronald H. Smith  
*Assistant Examiner*—Stuart D. Frenkel  
*Attorney, Agent, or Firm*—Kirschstein, Kirschstein, Ottinger & Frank

[57] ABSTRACT

A hybrid liquid toner composed of a mixture of two different types of liquid toner. One type is a liquid toner that includes a complex amphipathic molecule of which at least a fixer and a dispersant are polymeric moieties and which additionally includes a charge director and optionally includes a color agent, all of these being carried by a volatile organic solvent of high electrical resistivity. The other type of liquid toner is one that includes a fixer and a dispersant as separate chemical entities and further includes a charge director, a pigment type color agent and a carrier solvent such as mentioned above. The two toners can be mixed in a very wide range of proportions and when so mixed have several advantages which makes the hybrid toner particularly useful in connection with preparation of lithographic masters and microfiche reproductions by electrostatography as well as useful as an all purpose liquid toner.

9 Claims, No Drawings

METHOD OF CREATING AN IMAGE USING HYBRID LIQUID TONERS

CROSS REFFERENCE TO RELATED APPLICATIONS

This application is an improvement over applications Ser. No. 810,841 filed Mar. 26, 1969 for LIQUID TONERS, now abandoned and Ser. No. 7,253 filed Jan. 30, 1970 for LIQUID TONERS, now U.S. Pat. No. 3,753,760 dated Aug. 21, 1973, and is a continuation of Ser. No. 163,502 filed July 16, 1971 for HYBRID LIQUID TONERS, now abandoned.

BACKGROUND OF THE INVENTION

1. Field of the Invention

A hybrid liquid toner composed of a mixture of two toners, one of which includes an amphipathic molecule composed of various polymeric moieties having different functions at least one of which is a fixing function and another is a dispersant function and a second liquid toner which includes no amphipathic molecule but does include a fixer and a dispersant as separate chemical entities, preferably at least one of the toners including a color agent, and the hybrid toner further including a charge director, and an organic volatile liquid carrier solvent of high electrical resistivity.

2. Description of the Prior Art

A conventional prior art liquid toner typically was composed of a volatile organic liquid solvent system of high electrical resistivity in which there were carried several constituents, some being dispersed and others being dispersed or solvated. Exemplificatively, these other constituents were: a thermoplastic fixer, a dispersant, a pigment which frequently was carbon black, and a charge director, all of these being separate chemical entitles. This type of prior art toner will be referred to hereinafter as a "first" liquid toner.

A second type of liquid toner has been proposed in application Ser. No. 810,841 filed Mar. 26, 1969 for LIQUID TONERS, and in application Ser. No. 7253 filed Jan. 30, 1970 for LIQUID TONERS which is a continuation-in-part of application Ser. No. 810,841. This latter liquid toner will hereinafter be referred to as the "second" liquid toner. The second liquid toner was characterized by the presence therein of an amphipathic molecule which has at least one polymeric moiety thereof included a thermoplastic fixer and has at least another polymeric moiety thereof a dispersant so that these two moieties formed part of a single chemical entity which was a complex molecule. The amphipathic molecule could also include as another moiety thereof a color agent or the color agent could be a chemically separate entity in the second liquid toner. Furthermore, the second liquid toner included a charge director which was not part of the amphipathic molecule. Like the first liquid toner, the second liquid toner additionally included a liquid carrier which was a volatile organic solvent system of high electrical resistivity. Of the said one moiety and the said another moiety, at least one is thermoplastic. The said one moiety is soluble in the solvent system and a portion thereof is a fixative and a dispersant. The said another moiety is insoluble in the solvent system and has a particle size between 25 m$\mu$ and 25$\mu$, a portion of said another moiety being a fixative. Thereby the second type of liquid toner has a continuous phase constituting the solvent system with the said moiety dissolved therein and a dispersed phase constituting the said another moiety so that the amphipathic molecule acts as a mono-dispersed particle phase, a fixative and a dispersant.

Each of these two liquid toners had certain advantages and each had certain disadvantages, the disadvantages of the second liquid toner being comparatively minor but nevertheless existent. These disadvantages, and particularly the disadvantages of the second liquid toner, were not important factors in the use of the second liquid toner for most electrostatographic purposes such, for instance, as one of the most widespread applications thereof which constituted its employment in an office copying machine. However, the minor disadvantages of the second liquid toner did to some extent hinder its use in connection with the preparation of lithographic masters and of reproductions for microfiche purposes by an electrostatographic process.

Thus, it has been found that where the second liquid toner was used for making a lithographic master, although the master could be used for a large number of runs, for instance over 15,000, when the runs were considerably longer there was a tendency for the electrostatographically deposited image to deteriorate.

Electrostatographic lithographic masters are prepared by electrostatographically depositing a toner either with or without a color agent on a flexible base which is covered with a photoconductor coating that has had formed therein a latent electrostatic image and subsequently is developed by applying a liquid toner thereto. Both the photoconductor coating and the deposited toner image are oleophilic and to render the image and its carrier useful as a master the background areas having no deposits thereon must be rendered oleophobic which is accomplished by making them hydrophilic. This transformation is effected by a swabbing technique which, for example, employs a water solution of ferrocyanide or ferricyanide as an etchant that attacks the portion of the photoconductor coating which does not bear the electrostatographically deposited image. The photoconductor conventionally used in this technique is zinc oxide in a resin binder, this being a commercial electrostatographic paper.

In connection with the preparation of lithographic masters (as well as for general purposes) with the use of the first liquid toner, a serious disadvantage was present which occurred where the original to be reproduced contained one or more colored (non-white) areas of appreciable size, for instance in excess of one-fourth inch in any dimension. In such cases there was a marked tendency for the deposit of toner on the area to be of greater density adjacent the periphery than at the center. This drawback did not attend the use of the second liquid toner.

As to electrostatographic microfiche reproductions there was a minor disadvantage accompanying the use of the second liquid toner which was that there was a tendency, which might be caused by the large size of the complex molecule, for the boundary line of the image to waver slightly, i.e. to deviate slightly and almost unnoticeably from a faithful reproduction of the boundary line of the original. This disadvantage affected the ability to form a good enlargement of the microfiche image.

A far more serious disadvantage associated with the use of electrostatographic reproduction of microfiche images and which was inherent in the use of the first liquid toner was the difficulty in fixing the electrostatographically deposited image on the carrier. The carrier included a transparent thermoplastic film-forming material containing a transparent photoconductor which was utilized to form the latent electrostatic image, the same subsequently being developed. One such photoconductor which was widely used was a poly-N-vinyl carbazole. After the image had been deposited it had to be fixed. This fixing was accomplished by heating, but, since the film-forming material tended to become dimensionally unstable at approximately the temperature employed for fusing the image, there was a marked tendency for the image to distort which was unacceptable for microfiche uses.

SUMMARY OF THE INVENTION

1. Purposes of the Invention

It is an object of the present invention to provide an unique hybrid liquid toner which is not subject to any of the foregoing defects.

It is another object of the invention to provide a hybrid liquid toner which is capable of being employed in electrostatographic formation of a lithographic master that is capable of extended runs, well in excess of 15,000 reproductions, without deterioration.

It is another object of the invention to provide a hybrid liquid toner of the character described which has a good "fill" of solid-colored areas and yet is capable of being treated to enable the same to be used as a lithographic master.

It is another object of the invention to provide a hybrid liquid toner of the character described which is particularly useful for the preparation of microfiche images by electrostatographic processes and wherein the resolution is exceedingly good and heat fixing can be achieved without disturbing the dimensional stability of the transparent thermoplastic which constitutes the support for the developed image.

It is another object of the invention to provide a hybrid liquid toner of the character described which, in addition to being useful for the aforesaid purposes, can, without any modification whatsoever, be employed for conventional office copying purposes in any type of equipment using a liquid toner, thereby enabling the same toner to be employed universally for all kinds and types of purposes.

Indeed, it is an ancillary object of the invention to provide a hybrid liquid toner of the character described which can be used in any system in which a liquid toner of any kind can be employed as, for instance, in ink jet recording, for cathode ray tube read-outs and in conjunction with light beam writing, as well as cathode ray pin tubes and various types of transfer processes such as pressure transfer, vacuum transfer and electrostatic transfer.

2. Brief Description of the Invention

In general, the invention is carried out by combining two liquid toners utilizing, basically, functionally different systems, the two toners being admixable in an extremely wide range of proportions, exemplificatively as little as 0.5% of either the first or second liquid toner with the balance of the hybrid toner constituting the other liquid toner. As will be pointed out in the specific description, there are various advantages to be gained by adjusting these proportions in either direction.

The first toner is the type which, as of the date of this application, is known as a "conventional" toner and it includes as a liquid carrier a volatile organic solvent system of high electrical resistivity, e.g. at least one $10^9$ ohms centimeters. This liquid carrier has therein a fixer which may either be dispersed or solvated, a dispersant which usually is solvated, a charge director which may be solvated or dispersed and a pigment such, for instance, as carbon black which conventionally is dispersed.

The second liquid toner is of the type disclosed in the aforesaid patent applications Serial Nos. 810,841 and 7253. These generally include a solvent system such as the one used for the first toner. The solvent system has therein a complex amphipathic molecule that at least includes as polymeric moieties thereof a fixer and a dispersant and which may include as an additional moiety a color agent. The color agent may also be present in the second toner as a separate chemical entity, i.e. not part of the complex amphipathic molecule. The color agent is not necessarily present in either the first or the second liquid toner, although it is desirably employed. For example, it does not have to be included if the hybrid toner is to be used exclusively in the formation of a lithographic master although, even under such circumstances, its presence is desirable. Furthermore, the second toner includes a charge director which is not part of the amphipathic molecule.

When the two toners are admixed with the use of any conventional mixing equipment such, for instance, as a blender, a ball mill, a batch stirrer or a homogenizer, or even manually stirred, a hybrid toner is created which is particularly useful for forming lithographic masters and microfiche reproductions electrostatographically and is also useful as a general purpose electrostatographic developer both in ordinary business copy machines of all kinds and in the special type of equipment hereinbefore briefly alluded to, to wit, ink jet printers, cathode ray tube printers, light beam writing printers and transfer printers. Instead of preparing the two toners separately and then combining them, the ingredients for both toners can be mixed at the same time. The hybrid toner preferably includes a common solvent system and may include a common charge director(s) and color agent. Furthermore, the amphipathic molecule of the second liquid toner may be used as the dispersant for the first liquid toner.

DESCRIPTION OF THE PREFERRED EMBODIMENTS

Any conventional prior art first liquid toner can be employed. Such a toner includes a volatile organic liquid solvent system having a high electrical resistivity of at least about $10^9$ ohms centimeters.

Preferably, the solvent system includes one or more solvents of the petroleum type such a solvent commonly being referred to as a "petroleum fraction". This includes distillation fractions, catalytically cracked fractions and polymers of aliphatic monomers derived either synthetically or by distillation or cracking fractionation. Petroleum fractions are particularly useful in connection with the first toner because of the following attributes.

(a) quick evaporation, e.g., a thin film of the carrier will evaporate in a few seconds at a temperature below the char point of paper, so as to permit fast drying; (b) non-toxicity; (c) low odor; (d) the characteristic that when employed with soluble solid film-forming agents it will fully escape therefrom so as to leave the solid film deposited by such agent tack-free and not subject to evaporation over protracted periods of time after the deposited image is seemingly dry; (e) sufficient fluidity to allow the particles of pigment to migrate therethrough with ease so that the pigment is capable of being quickly electrostatically attracted to and coupled with the pattern of electrostatic charges which is to be developed; (f) not attacking the coating binders on a base sheet and not attacking other ingredients of the sheet; (g) not bleeding the electrostatic charges before the pigment is deposited so as to maintain any desired degree of contrast; and (h) inexpensiveness.

In order to obtain these beneficial attributes, the petroleum fraction, i.e., paraffinic solvent, should have an evaporation rate at least as fast as that of kerosene, but slower than that of hexane. Thereby, the evaporation of the liquid from a film will be rapid, e.g., two seconds, at a temperature slightly below the char point of paper, it being frequently customary to raise the temperature of the film of liquid developer to this level for the purpose of evaporating the developer after the opaque electroscopic particles of pigment have been deposited by attraction on the electrostatically charged pattern. The petroleum fraction should have a low K. B. (Kauri-butanol) number, to wit, less than 35, and preferably between 26 and 35. This low K. B. number minimizes the possibility that the petroleum fraction will attack the coating binder, e.g., the binder of the zinc oxide, or will attack any sizing on the sheet, e.g., paper, upon which the coating is applied. The petroleum fraction also should be substantially free of aromatic liquid constituents, i.e., it should be substantially aromatic-liquid-free. This term, as used herein, connotes that the proportion of aromatic liquids in the organic liquid carrier should not be in excess of two per cent by weight. The aromatic liquids have a strong tendency to attack the coating binders, e.g., the coating binders for zinc oxide, but in concentrations of less than two per cent this tendency is so negligible as to be unnoticeable. The petroleum fraction must have a high electrical resistivity, e.g., in the order of at least about $10^9$ ohm centimeters, and a dielectric constant of less than three and one-half, so that the liquid carrier will not dissipate the pattern of electrostatic charges which are to be developed. The TCC (Tagliabue closed cup) flash point of the liquid carrier should be at least 100° F and preferably about 120° F to 152° F, whereby under the conditions of use the liquid is considered non-flammable. The paraffinic solvent also is non-toxic. It possesses no objectionable odor and preferably is odor-free, this being denoted by the term "low odor". Consonant with its low dielectric constant and high resistivity, the liquid carrier is non-polar. The solvent system should have a low viscosity for the purpose, as indicated above, of permitting rapid migration therethrough of opaque electroscopic charged pigment particles which are to be attracted in large number to the electrostatically charged image which is to be developed. Such viscosity should be between 0.5 and 2.5 centipoises at room temperature. The petroleum fraction also is inexpensive.

Examples of petroleum fraction organic liquid carriers having physical characteristics which fall within the foregoing criteria are Shell Sol 71, manufactured by Shell Oil Company; Isopar G, Isopar H, Isopar K, and Isopar L, manufactured by Humble Oil and Refining Company; Amsco OMS, Amsco 460 Solvent and Amsco Odorless Insecticide Base manufactured by American Mineral Spirits Company; and odorless kerosene. All of the foregoing are low odor paraffinic solvents. The dielectric constant of Shell Sol 71 is 2.06 at room temperatures. The other solvents have dielectric constants of the same order of magnitude. Other physical characteristics of Shell Sol 71, Isopar G, Isopar H, Isopar K, Isopar L, Amsco OMS, Amsco 460 Solvent and Amsco Odorless Insecticide Base which fingerprint these solvents and denote the presence of several of the above listed attributes are set forth below:

|  | Distillation | | Flash Pt. | K.B. | Aniline | Sp. Gr. |
|---|---|---|---|---|---|---|
|  | IBP* ° F. | Dry End Pt. ° F. | ° F. TCC | No. | Pt. ° F. | 60°/60° F. |
| Shell Sol 71 | 345 | 398 | 121 | 26.5 | 183 | 0.7563 |
| Isopar G | 318 | 347 | 105 | 28.0 | 178 | 0.748 |
| Isopar H | 350 | 371 | 123 | 26.9 | 183 | 0.7571 |
| Isopar K | 349 | 383 | 126 | 26.5 | 185 | 0.7587 |
| Isopar L | 372 | 406 | 144 | — | 187 | 0.7674 |
| Amsco OMS | 352 | 386 | 125 | 27.0 | 184.5 | 0.7608 |
| Amsco 460 Solvent | 375 | 456 | 150 | 34.5 | 146.5 | 0.8108 |
| Amsco Odorless Insecticide Base | 375 | 482 | 152 | 26.5 | 175.0 | 0.7711 |

*Initial Boiling Point ASTM D-1078

The second constituent of the first liquid toner is the fixer which may be dispersible or soluble in the organic solvent system. The fixer acts as a film-forming agent in the developed image, holding the pigment bound to the carrier sheet. The fixing agent is solid at room temperatures and in the absence of a solvent therefor. The fixing agent, if soluble in the solvent system, preferably is fully soluble therein and has a good solvent release characteristic, which is to say, it must permit the solvent system to evaporate completely and quickly through a solid coherent film-like deposit left as a residue after solvent evaporation. The film left by the fixer either with or without heating of the deposited fixer, as the case may be, must be tackfree, tough and coherent so that the developed image will not smear or shred and will be resistent to deterioration. Moreover, the fixer should be compatible with the binder for the photoconductor coating, e.g. with the binder for a photoconductor zinc oxide coating, and should bond well to said coating in order to avoid any tendency of the finished image to separate or peel from the coated sheet. The following constitute excellent fixers, some of these being of the solvatable type and others being of the non-solvatable type:

Resin NC 11, manufactured by Hercules Powder Company. This is a pale thermoplastic acidic wood rosin that has been both polymerized and hydrogenated. It has a softening point of 85° C to 93° C by the Hercules drop method and an acid number of 145-65. Its density at 20° C is 1.065. It has a saponification number of 155-165. Its degree of hydrogenation is about 90% and it has an average molecular weight of 360. About 20% of the rosin acids are polymerized.

Other useful fixers are:

| Resin | Manufacturer | Description | Acid No. | *Softening Pt. ° C |
|---|---|---|---|---|
| Lewisol 7 | Hercules | Glycerol ester of modified wood rosin | 8 | 168 HDM |
| Pentalyn A | Hercules | Pentaerythritol ester of wood rosin | 12 | 111 HDM |
| Pentalyn C | Hercules | Pentaerythritol ester of polymerized wood rosin | 14 | 135 HDM |
| Pentalyn G | Hercules | Modified pentaerythritol ester of wood rosin | 14 | 135 HDM |
| Pentalyn H | Hercules | Pentaerythritol ester of hydrogenated wood rosin | 13 | 104 HDM |
| Pentalyn K | Hercules | Pentaerythritol ester of dimeric resin acids | 14 | 192 HDM |
| Pentalyn X | Hercules | Modified pentaerythritol ester of wood rosin | 14 | 159 HDM |
| Pentalyn 860 | Hercules | Pentaerythritol ester of dimeric resin acids | 15 | 172 HDM |
| Polypale Ester 10 | Hercules | Glycerol ester of polymerized wood rosin | 6 | 112 HDM |
| Staybelite Resin | Hercules | Hydrogenated wood rosin | 165 | 76 HDM |
| Krumbhaar 484 | Lawter Chemicals, Inc., Krumbhaar, Resin Division | Pentaerythritol ester of modified wood rosin | <1 | 180–190 MM |
| Nevchem 100 | Neville Chemical Company | + | | |

*HDM- Hercules Drop Method
MM- Mercury Method
R&B- Ring and Ball

+A thermoplastic petroleum hydrocarbon resin in which the units in the polymer are predominantly aromatic or cyclic in structure. It is prepared by the polymerization of unsaturated hydrocarbon fractions boiling between about 125° C and about 250° C, having a Sp. Gr. (15.6/15.6° C) of between 0.90 and 0.95. The polymerizable constituents comprise between about 30% to 90% by weight and the principal polymerizable monomers are:

| | |
|---|---|
| cyclodiene dimers** | 5–30% |
| indene | 5–20% |
| vinyl toluene | 5–25% |
| styrene | 0–10% |

**Such as dicyclopentadiene ($C_{10}$); di-methylcyclopentadiene ($C_{12}$) codimer of cyclopentadiene and methylcyclopentadiene ($C_{11}$).

The balance dry weight of the hydrocarbon fraction is constituted of essentially unpolymerizable paraffins, naphthenes and aromatics containing 8 or more carbon atoms per molecule and boiling within the aforementioned range, i.e., between about 125 and 250° C. The unsaturated hydrocarbon fractions from which the resin is obtained come from high temperature and low pressure pyrolysis of normally liquid or gaseous hydrocarbons having 2 or more carbon atoms per molecule. The cracking operation may be by-products of pyrolytic processes in which the principal products sought are low boiling olefines and dienes such as ethylene, propylene, butenes, butadiene, etc. which are widely used base hydrocarbons in the petrochemical and plastics fields including elastomers. Pyrolysis of both liquid and gaseous hydrocarbons for such purposes is well known and need not be described in detail.

| Test Property | Nevchem 100 (Typical Properties) |
|---|---|
| 1. Softening Point (R&B) ° C. | 100 |
| 2. Molecular Weight (No. Ave) | 800 |
| 3. C/H Weight ratio | 10.5 |
| 4. Sp. Gr. 25/25° C. | 1.090 |
| 5. Refr. Index 25° C/D | 1.602 |
| 6. Iodine Number | 65 |
| 7. Acid Number | <1 |

List of Test Methods:
1. ASTM E-28–58-T
2. Osmotic
3. Combustion Analysis
4. ASTM D-71–52
5. Neville Method (toluene solution, extrapolated to solid resin)
6. ASTM D-555

| Resin | Manufacturer | Description | Acid No. | Softening Pt. ° C. |
|---|---|---|---|---|
| Foral 85 | Hercules | Fully hydrogenated glycerol ester of wood rosin | 9 | 82 HDM |
| Cellolyn 104 | Hercules | Internally plasticized pentaerythritol ester of wood rosin | 30 | 101 HDM |
| Dymerex | Hercules | Dimeric resin acids | 143 | 152 HDM |
| Pliolite VTAC-L | Goodyear | Vinyl toluene/acrylate copolymer | 6.1 | 47 R&B |
| Neocryl B-707 | Polyvinyl Chemicals | Vinyl toluene/n-butyl methacrylate/stearyl methacrylate (disclosed in USLP 3,378,513, Example 23) | | 115 R&B |

All the foregoing fixers except the last two are solvatable in one or more of the above listed organic solvents; the last two are not solvatable in most of said solvents but can be employed therewith in disperse form for the first liquid toner.

The third constituent of the first liquid toner is a dispersant which may either be solvatable in the solvent system or non-solvatable; conventionally the dispersant is solvatable in said solvent system. The function of the dispersant, as is well known, is to disperse the pigment particles of sub-micron range in the non-polar solvent system that is employed. The dispersant must be compatible with the fixer and desirably is or includes a fixer in its own right. Desirably, also, the dispersant will augment the charge direction of the pigment particles.

Examples of solid dispersants having the foregoing physical characteristics are: Lube Oil 564 and FOA 2. Lube Oil 564 is manufactured by du Pont and is composed of 50% of methacrylate polymer and 50% of kerosene. Insofar as the above examples of dispersants are concerned, it is the solid constituents that constitutes the dispersant, the liquid carrier merely forming a convenient vehicle therefor. Other dispersants include:

Alkanol DOA manufactured by duPont and constituting an oil additive constituting a terpolymer prepared from a weight mixture of 50 parts of octadecenyl methacrylate, 10 parts diethylaminoethyl methacrylate, and 40 parts styrene, the same being polymerized by conventional bulk, solution or dispersion polymerization methods involving known initiators including oxygen-yielding compounds, such as benzoyl peroxide, and azo compounds such as alpha, alpha' azodiisobutyronitrile. The polymerization process preferably is carried out in an inert atmosphere, for example, nitrogen or carbon dioxide, at conventional temperatures ranging, as is well known, from 30° C. to 150° C, depending on the catalyst used, and generally between 50° to 70° C where the catalyst is alpha, alpha' azodiisobutyronitrile. The polymerization is carried substantially to completion to eliminate substantially all of the unpolymerized monomers, it being understood that "substantially to completion" as used herein denotes that there is a remainder of from 0% to 15% of total monomers. The aforesaid terpolymer is dissolved in kerosene in proportions of 50% by weight of the terpolymer to 50% by weight of kerosene. The terpolymer constitutes, as is seen, several completely organic compounds combined in proportions to effect the optimum balance between polar-active and oil-soluble groups. The said terpolymer is large and has an average molecular weight of 50,000.

Still other dispersants that may be used are those disclosed in U.S. patent 3,048,544, namely alkyl methacrylate maleic anhydride polymer, maleimide polymer, a polymer constituting the reaction product of alkyl methacrylate, polyethylene glycol methacrylate and maleic anhydride, and a polymer constituting the reaction product of alkyl methacrylate, polyethylene glycol methacrylate and imide of maleic anhydride, and tetraethylene pentamine; the polyglycol substituted polyesters disclosed in U.S. Pat. No. 3,083,187; and the polyglycol substituted polyamides disclosed in U.S. Pat. No. 3,083,188. The methods of preparation of these latter dispersants are detailed in said patents.

The fourth constituent of the first liquid toner is a pigment.

The pigment employed can be any one of the many now known to the art in connection with liquid electrostatographic developers. As is well-known, these pigments essentially constitute very fine solid particles the size of which is in the submicron range, which are opaque in mass and which are capable of acquiring an electroscopic charge. They are insoluble in the liquid carrier. So many different kinds and species of pigments are known that only typical representative examples will be mentioned. These are: powdered metals, e.g., powdered aluminum; powdered metal oxides, e.g., powdered magnetic iron oxide; powdered metal salts, e.g., powdered cadmium selenide (CdSe), powdered lead iodide (PbI$_2$), powdered lead chromate (PbCrO$_4$); Cyan Blue GT 55-3295 (American Cyanamid Company, Pigments Division)* (74160)** described in United States Letters Patent No. 2,486,351; Cibacron Black BG (Ciba Company, Inc.); Cibacron Turquoise Blue G (Ciba); Cibalon Black BGL (Ciba); Orasol Black BRG (Ciba); Orasol Black RBL (Ciba); Acetamine Black CBS (E. I. du Pont de Nemours and Company, Inc.); Crocein Scarlet N Ex (du Pont) (27290); Fiber Black VF (duPont) (30235); Luxol Fast Black L (duPont) (Solv. Black 17); Nigrosine Base No. 424 (duPont) (50415 B); Oil Black BG (duPont) (Solv. Black 16); Rotalin Black RM (duPont); Sevron Brilliant Red 3 B (duPont); Basic Black DSC (Dye Specialties, Inc.); Hectolene Black (Dye Specialties); Azosol Brilliant Blue B (General Aniline and Film Corporation, Dyestuff and Chemical Division) (Solv. Blue 9); Azosol Brilliant Green BA (General Aniline) (Solv. Green 2); Azosol Fast Brilliant Red B (General Aniline); Azosol Fast Orange RA Conc. (General Aniline) (Solv. Orange 20); Azosol Fast Yellow GRA Conc. (General Aniline) (13900 A); Basic Black KMPA (General Aniline); Benzofix Black CW-CF (General Aniline) (35435); Cellitazol BNFV Ex Soluble CF (General Aniline) (Disp. Black 9); Celliton Fast Blue AF Ex Conc (General Aniline) (Disp. Blue 9); Cyper Black IA (General Aniline) (Basic Blk. 3); Diamine Black CAP Ex Conc (General Aniline) (30235); Diamond Black EAN Hi Con. CF (General Aniline) (15710); Diamond Black PBBA Ex (General Aniline) (16505); Direct Deep Black EA Ex CF (General Aniline) (30235); Hansa Yellow G

* material in first parentheses indicates name of manufacturer. ** material in second parentheses indicates color index number. (General Aniline) (11680); Indanthrene Black BBK Powd. (General Aniline) (59850); Indocarbon CLGS Conc. CF (General Aniline) (53295); Katigen Deep Black NND Hi Conc. CF (General Aniline) (53190); Nyliton Black B (General Aniline); Palatine Fast Black WANA Conc. CF (General Aniline) (15711); Rapidogen Black 3 G (General Aniline) (Azoic Blk. 4); Sulphon Cyanine Black BA-CF (General Aniline) (26370); Zambezi Black VD Ex Conc. (General Aniline) (30015); Azo Oil Black (National Aniline Division of Allied Chemical and Dye Corporation (Solv. Blk. 12); Iosol Blue 6 G (National Aniline) (Solv. Blue 30); Spirit Nigrosine SSB (National Aniline) (50415); Methyl Violet T Lake (N.Y. Color and Chemical Co.) (42535); Rubanox Red CP-1495 (The Sherwin-Williams Company) (15630); Victoria Blue Molybdate Lake (Standard Ultramarine and Color Co.) (42595); Black M Toner (General Aniline) a mixture of carbon black and black dye precipitated on a lake; Toner 8100 (Paul Uhlich and Company, Inc.) a mixture of carbon black and black dye precipitated on a lake; Raven 11 (Columbian Carbon Company) carbon black aggregates with a particle size of about 25μ, Statex B-12 (Columbian Carbon Co.) a furnace black of 33μ average particle size and chrome green.

The fifth constituent of the first liquid toner is a charge director.

The charge directors which are per se well known in the field of liquid electrostatographic image developers must be soluble or dispersible in the paraffinic solvent system and must create or augment an electrostatic charge on the sub-micron pigment particles. Examples of useable charge directors are:

Aerosol OT which is di-2-ethylhexyl sodium sulfosuccinate;

Aerosol TR which is di-tridecyl sodium sulfoccinate; the aluminum, chromium, zinc and calcium salts of 3,5-dialkylsalicylic acid, wherein the alkyl group is propyl, isopropyl, butyl, isobutyl, tertiary butyl, amyl, isoamyl and other alkyl groups up to C-18;

the aluminum, chromium, zinc and calcium salts of dialkyl gamma-resorcylic acid, wherein the alkyl is as above;

the isopropylamine salt of dodecylbenzene sulfonic acid;

aluminum, vanadium and tin dresinates (the metal dresinates are prepared by adding a solution of the metal sulfate to a solution of the sodium salt of Dresinate 731 manufactured by Hercules Powder Co.);

cobalt, iron, lithium, tin and manganese octoates;

OLOA 1200 which is a product of the Oronite Division of California Chemical Co., the same being a partially imidized polyamine with lubricating-oil soluble polyisobutylene chains and free secondary amines, its specifications are: gravity at 60° F. API 22.9, specific 0.92 flash point by the Cleveland open cup method, 425° F., viscosity at 210° F., 400 SSU, color (ASTM D-1500) L55D, nitrogen, percentage by weight 2.0, and alkalinity value, (SM-205-15) 43;

soya bean lecithin;

an aluminum salt of 50-50 by weight mixture of the mono- and di-2 ethylhexyl esters of phosphoric acid;

zinc, lead, copper, cadmium, calcium, aluminum and iron stearates;

zinc and aluminum palmitates;

aluminum oleate;

copper, manganese, cobalt and lead linoleates;

manganese linoresinate; and

Nalcamine G-14, manufactured by Nalco Chemical Co., this being 1-[2-hydroxyethyl]-2-[mixed pentadecyl and heptadecyl]-2-imidazoline.

The linoresinates are metal soaps of tall oil.

The various constituents of the first liquid toner are almost invariably chemically inert to one another at ambient temperatures and are inert to the various constituents of the second liquid toner at like temperatures. All of the constituents of the first liquid toner are selected and admixed solely for their physical characteristics and generally not for chemical interaction. The constituents are heat stable under conditions of use and at temperatures to which they are exposed in transit and in storage. An electrostatographic developing bath solely constituting the first liquid toner will not gel under the operating conditions prevailing in a liquid electrostatographic developing apparatus, i.e. at a temperature up to as high as 125° F. Moreover, such heat stability and non-gelling characteristics carry over into the second liquid developer component of the hybrid liquid developer of the present invention.

The following are examples of liquid electrostatographic first toners in concentrated form:

EXAMPLE I

| | |
|---|---|
| 40 gs. | Krumbhaar 484 |
| 15 gs. | Toner 8100 |
| 15 gs. | Spirit Nigrosine SSB |
| 5 gs. | Raven 11 |
| 50 gs. | Alkanol DOA |
| 150 mls. | Shell Sol 71 |
| 2 gs. | Manganese linoleate |
| 2 gs. | Aluminum stearate |

EXAMPLE II

| | |
|---|---|
| 25 gs. | Nevchem 100 |
| 9 gs. | Toner 8100 |
| 9 gs. | Spirit Nigrosine SSB |
| 120 gs. | Shell Sol 71 |
| 0.25 g. | Aluminum dresinate |
| 17.5 gs. | Alkanol DOA |

EXAMPLE III

| | |
|---|---|
| 55 gs. | Resin NC-11 |
| 17.5 gs. | Alkanol DOA |
| 182 gs. | Shell Sol 71 |
| 0.5 g. | Aluminum stearate |
| 28 gs. | Cyan Blue GT 55-3295 |

EXAMPLE IV

| | |
|---|---|
| 25 gs. | Staybelite |
| 20 gs. | Alkanol DOA |
| 10 gs. | Mineral oil (U.S.P.) |
| 15 gs. | Toner 8100 |
| 9 gs. | Statex B-12 |
| 100 gs. | Isopar K |

EXAMPLE IV-continued

| | |
|---|---|
| 1 g. | Tin octoate |

The mineral oil is employed to slightly increase viscosity and thereby reduce the settling for insoluble constituents and to inhibit the tendency of the concentrate to dry out and form a crust in the feeder valve.

EXAMPLE V

| | |
|---|---|
| 55 gs. | Resin NC-11 |
| 17.5 gs. | Lube Oil 564 |
| 1 g. | Aluminum stearate |
| 182 gs. | Isopar H |
| 30 gs. | Powdered cadmium selenide |

EXAMPLE VI

| | |
|---|---|
| 25 gs. | Nevchem 100 |
| 20 gs. | Alkanol DOA |
| 10 gs. | Polymerized castor oil |
| 15 gs. | Black M Toner |
| 9 gs. | Statex B-12 |
| 100 gs. | Isopar K |
| 0.5 g. | Cobalt octoate (12% solution in mineral oil) |

The polymerized castor oil is use for the same purpose as the mineral oil.

EXAMPLE VII

| | |
|---|---|
| 25 gs. | Foral 85 |
| 20 gs. | Alkanol DOA |
| 10 gs. | Polymerized castor oil |
| 15 gs. | Toner 8100 |
| 9 gs. | Statex B-12 |
| 100 gs. | Isopar G |
| 0.5 g. | Aluminum stearate |

EXAMPLE VIII

| | |
|---|---|
| 25 gs. | Nevchem 100 |
| 20 gs. | Alkanol DOA |
| 10 gs. | Polymerized castor oil |
| 15 gs. | Toner 8100 |
| 9 gs. | Statex B-12 |
| 100 gs. | Isopar K |
| 0.5 g. | Cobalt Octoate (12% solution in mineral oil) |

EXAMPLE IX

| | |
|---|---|
| 25 gs. | Staybelite Resin |
| 20 gs. | Alkanol DOA |
| 10 gs. | Polymerized castor oil |
| 15 gs. | Toner 8100 |
| 9 gs. | Statex B-12 |
| 100 gs. | Isopar G |
| 5 drops | Aluminum dresinate (10% solution in Isopar G) |

EXAMPLE X

| | |
|---|---|
| 25 gs. | Staybelite Resin |
| 20 gs. | Alkanol DOA |
| 10 gs. | Polymerized castor oil |
| 20 gs. | Statex B-12 |
| 4 gs. | Cyan Blue GT |
| 1 g. | Aluminum stearate |
| 100 gs. | Isopar K |

Each of the foregoing concentrated liquid electostatographic developers is formed by introducing all of the recited ingredients into a ball mill and milling the same therein at room temperature or above, e.g. 110° F, for an extended period of time, e.g. 24 hours.

The second liquid toner used in the hybrid toner of the present invention is described in detail in application Ser. Nos. 810,841 and 7,253, but is redescribed below for the sake of completeness. The second liquid toner essentially consists of a solvent system, optionally a coloring agent, and a complex molecule including plural moieties of which at least one is solvated by the solvent system and at least one is non-solvated by the solvent system, the color agent optionally being in the form of a moiety of the molecule in the nature of a chromophore. At least one of the moieties is of a resinous nature and serves as a fixative. The nonsolvated moiety provides a solid particle in the solvent system (the continuous phase) enabling the desired size of between $25\mu$ and $25\mu$ to be formed and permitting electrophoretic deposition to take place in the formation of a patterned deposit on a substrate, e.g, enabling electrostatic attraction to take place between a particle and a latent electrostatic image on a copy sheet. The solvated moiety functions to maintain the complex molecule in suspension, that is to say, to prevent settling of the molecule and hence, in effect, operates as a dispersing agent. Thus, in the complex molecule, several functions of constituents of conventional (first type) toners are amalgamated. It should be observed that the polymeric moiety or moieties which impart the resinous characteristic to the complex molecule may be either the solvent solvated moiety or the solvent non-solvated moiety or both. This complex molecule is a so-called "tailored" molecule, that is to say, it is an artificially created molecule which in a single compound provides plural functions required in a toner of the first type the presence of plural chemically separate constituents. A charge director is an additional most desirable component of the second liquid toner.

The basic building block of the second liquid toner is the solvent system. The term "basic building block" is not used in the sense that the solvent system is the core of the complex molecule which is employed, but rather that the nature of the solvent system influences the particular type complex molecule that is to be employed. Once the solvent system has been chosen, certain parameters of the second liquid toner developer constituents and specifically of the complex molecule, are indicated. Any type of solvent system can be used which is compatible with the first liquid toner, indeed the two liquid toners are mutually compatible, and with the particular apparatus and method using any specific form of a hybrid liquid toner embodying the present invention. Preferably both the first and the second liquid toners employ the same solvent system. Both liquid toners of the two toners whose admixture constitutes the present invention preferably are based upon a non-polar solvent system such as is conventionally employed presently in the creation of most patterned deposits and is currently widely used in electrostatographic toners. Nevertheless, the second liquid toner is not limited to a non-polar solvent system and can be equally well employed with a polar solvent system, where such a system is practical in any specific apparatus or method that can make use of such a toner and where the first liquid toner uses the same or a compatible solvent system. Because the present large-scale commercial use of liquid toners is with apparatuses and methods that utilize non-polar solvents, the following description of the second liquid as to the particular examples and compositions stresses a non-polar continuous phase, i.e., solvent system. Such a non-polar solvent system includes an organic non-polar liquid having the characteristics of those previously mentioned above and referred to in particular under subdivisions (a)–(h) above which are incorporated here by reference. Examples of such solvent systems are identical to those described with respect to the solvent systems of the first liquid toner and, indeed, it is preferred to use identical solvent systems for both the first and the second liquid toners so that the hybrid toner utilizes a single solvent system.

The second liquid toner uses with the solvent system a complex molecule having the moieties mentioned above. Hence, the second liquid toner is basically a latex toner, which is to say, a toner that looks like a natural latex in that it constitutes a liquid continuous phase having the desired attributes for use in a patterned deposition system, together with a dispersed phase which is an amphipathic polymer. The term "latex" as used herein refers to a colloidal suspension of a synthetic polymer in any liquid, for instance, as prepared by emulsion or suspension polymerization. An "amphipathic" substance is one that has an affinity for two different materials, for instance, oil or water, or two different phases, so that one moiety of the amphipathic polymer, which is the foregoing complex molecule, will be solvated by the phase for which it has an affinity, which, in this instance, is the solvent system, and another moiety will not be solvated by this same phase, that is to say, will be insoluble in this phase, so that the phenomenon is created when the amphipathic polymer is contained in the solvent system of at least one moiety of the polymer being solvated by the solvent system and at least one moiety being non-solvated by the solvent system. The amphipathic polymer combines in one complex molecule the fixing agent, which is one or more of the moieties, the dispersing agent, which is one or more of the moieties, and optionally, a color agent, which is one or more of the moieties. This complex molecule, i.e., amphipathic polymer, by virtue of the fact that it is a molecule rather than a composition including a mixture of pigment particles, creates a narrow range of size distribution of the non-solvated particles which ultimately are deposited on a substrate, e.g., a copy sheet, as by electrostatographic developemnt, to create a patterned deposition. Desirably the particle size distribution of the non-solvated particles in the second liquid toner is within two orders of magnitude and preferably is within about one order of magnitude. The foregoing ranges are what is denoted by the term "mono-dispersed".

The second liquid toner is created generally as follows: Firstly, the solvent system for the second toner is chosen, for example, a non-polar solvent such as a petroleum fraction like the ones mentioned above, although as previously observed, other solvents could be used, e.g. polar solvents such as water.

It is appropriate to reiterate at this point that patterned depositions utilizing electrostatic phenomena, e.g., electrophoresis, do not necessarily involve the use of non-polar solvent systems for either of the first and the second liquid toners. Thus an electrostatic method using water as the carrier system in electrostatography is shown in U.S. Pat. No. 3,425,829, issued Feb. 4, 1969. Other suitable solvent systems, by way of example, i.e., solvent systems other than petroleum fractions and water, include alcohols, e.g., those having 1 to 6 carbon atoms, such as ethylene glycol; ethers, including ethyl isobutyl ether, methyl isopropyl ether, the ($C_1$–$C_4$) alkyl mono ethers of ethylene glycol, and dioxane; ketones, including acetone, methyl ethyl ketone, methyl isopropyl ketone, and ethyl isobutyl ketones; esters, including ethyl acetate, amyl acetate, butyl propionate, and the acetates of the mono- ($C_1$–$C_4$)- alkyl ethers of ethylene glycol; and halogenated hydrocarbons, such as chloroform, ethylene dichloride, monochloro benzene and certain Freons.

After selection of the solvent system a polymeric backbone molecule is chosen for the second liquid toner, which is solvated by the selected solvent system, i.e., which is fully soluble to the limit of its solubility. Next a graft or block polymerization or copolymerization is carried out in such a manner, hereinafter described, that non-solvated polymeric chains, which is to say, polymeric chains which are not solvated by the chosen solvent system, are created in the solvent system and are chemically joined with, i.e., to, the solvated polymeric backbone molecule. The mechanism by which the chains are created and chemically joined is not of critical importance. For example, the chains first can be formed and then grafted onto the polymeric backbone molecule or a molecule of a grafting monomer can be first reacted with the polymeric backbone molecule and subsequently this first monomer can be polymerized with the other grafting monomers present in the solvent system.

The non-solvated moiety, i.e., fraction or chains, originates as a monomer which usually and preferably is solvated by the solvent system for convenience in carrying out the reaction and to minimize the time required for the reaction and also to eliminate the need for solubilizers or multi-solvent systems in the second liquid toner. However, as the reaction for the formation of the chains proceeds, the addition to the backbone polymer, which is to say, the newly formed chains, become progressively non-solvated and eventually becomes a non-solvated moiety (portion) which constitutes a dispersed phase, this, despite the fact that the polymeric backbone still is solvated by the solvent system. It is interesting to observe that the reaction as it takes place initially causes a transformation of the clear solution of the solvated backbone polymer and of the solvated monomer first into a slightly hazy stage and then becomes more turbid as the minutes pass until ultimately a latex is formed.

It is also possible to use a reverse process in which a non-solvated polymeric backbone is partially solvated by graft or block polymerization.

As mentioned previously, the largest present-day commercial use for liquid toners in in electrostatography such as is used in the so-called "liquid" xerographic copying machines. The solvent system used in liquid toners for such purpose is usually a petroleum fraction such as described heretofore with respect to the first liquid toner and, hence, in detailing various process steps in the manufacture of the complex molecule this particular solvent system will be employed, although it is understood that the second liquid toners can employ any solvent system whatsoever.

Assuming, then, that the solvent system for the second liquid toner is a petroleum fraction, a polymeric backbone material is selected which is solvated by such petroleum fraction. A popularly employed petroleum fraction is odorless mineral spirits (hereinafter OMS). There are many polymeric materials which are solvated by OMS. These include, e.g., polymeric materials derived from natural sources such as crepe rubber; refined oxidized linseed oil and degraded rubber, and synthetic polymers such as alkyd resins; polyisobutylene; polybutadiene; polyisoprene; polyisobornyl methacrylate; acrylic polymers of long chain esters of acrylic or methacrylic acid such as stearyl, lauryl, isodecyl, octyl, 2-ethylhexyl and hexyl; butyl esters of acrylic or methacrylic acids; polymeric vinyl esters of long chain acids such as vinyl stearate, vinyl laurate, vinyl palmitate and vinyl myristate; polymeric vinyl alkyl ethers, including poly (vinly ethyl ether) sold under the trademark Bakelite EDBM by Union Carbide Corp., poly (vinyl isopropyl ether), poly (vinyl isobutyl ether) and poly (vinyl n-butyl ether). As can be seen from the examples given, the polymers chosen have a structure similar to that of the solvent which is going to solvate them, i.e., the polymers and the solvent system have a similar degree of polarity. As long as this similar polarity is maintained, copolymers, e.g., lauryl methacrylate-butyl acrylate, t-octyl methacrylate-butyl methacrylate, lauryl methacrylate-glycidyl methacrylate, 2-ethyl hexyl acrylate-acrylic acid, isodecyl methacrylate-diethylaminoethyl methacrylate and vinyl toluene-butadiene; terpolymers, e.g., lauryl methacrylate-isodecyl methacrylate-methyl methacrylate, stearyl methacrylate-cyclohexyl acrylate-methacrylic acid, octyl acrylate-crotonic acid-dodecyl methacrylate, glycidyl methacrylate-stearyl methacrylate-lauryl methacrylate, lauryl methacrylate-octyl methacrylate-glycidyl methacrylate and isodecyl methacrylate-stearyl methacrylate-acrylic acid; and tetrapolymers, e.g., N-vinyl pyrrolidone-butyl acrylate-lauryl methacrylate-stearyl methacrylate and acrylic acid-stearyl acrylate-methyl methacrylate-isodecyl acrylate, may be used, as well as block and graft copolymers, block and graft terpolymers, block and graft tetrapolymers and multi-type monomer/polymers in general as the backbone structure.

If desired, the backbone structure with or without added chains can be created in a solvent other than that in which it is ultimately to be used, i.e., in a solvent other than the solvent system of the second liquid toner. The original solvent in which the backbone structure with or without added chains is created can either be extracted or it can be part of a multi-solvent system in the second liquid toner. Many monomers which it might be desirable to employ in building a backbone structure are not sufficiently solvated by OMS or other solvent system of the second liquid toner to enable the polymerization of the desired structure to be effected in OMS. In such a case, a copolymerization utilizing such insufficiently solvated monomers may be carried out in a solvent of higher K.B. number with another monomer which is solvated by OMS, as long as the resultant copolymer contains enough of the second monomer so that the backbone can be solvated by OMS. Such a copolymerization, for example, could be carried out in benzene, the resulting copolymer precipitated by the addition of methanol, freed from solvent, and dissolved in OMS to function as the backbone during the subsequent graft or block polymerization or graft or block copolymerization.

The discussion above of synthetic polymeric materials suitable for use as the backbone, also often hereinafter sometimes referred to as the "precursor", in an OMS-based electrostatographic toner system is not limited to addition polymers; synthetic condensation polymers can also serve as the backbone or precursor in this system as long as they can be solvated by the chosen solvent medium e.g., the self-condensation polymer of 12-hydroxystearic acid.

Inasmuch as the second liquid toner is not limited to the use of any particular solvent system, there is no limitation on the monomers that can be used to fabricate the polymeric constituents of such system. In the particular system being discussed, however, that based on OMS, the following list of backbone polymers is exemplificative but not exclusive:

a. the homopolymers of the $C_4$–$C_{22}$ esters of acrylic and methacrylic acid, such as polyhexyl methacrylate and acrylate, polyisodecyl methacrylate and acrylate, polylauryl methacrylate and acrylate, polytetradecyl methacrylate and acrylate, and polystearyl methacrylate and acrylate, all in the molecular weight range of about $10^3$ to about $10^6$, but preferably not smaller than $10^4$;

b. copolymers, with each other, of any of the above monomers used to form the homopolymers under (a), and also with the methyl, ethyl, isopropyl and propyl esters of acrylic and methacrylic acid, provided that the ratios of non-solvated to solvated monomers are kept in a proportion such as to insure solvation of the resulting copolymer by OMS;

c. copolymers of the above mentioned methacrylic and acrylic acid esters with monomers containing other functional groups as, for example, acrylic acid, methacrylic acid, crotonic acid, maleic acid, atropic acid, fumaric acid, itaconic acid, citraconic acid, acrylic anhydride, methacrylic anhydride, maleic anhydride, acryloyl chloride, methacryloyl chloride, acrylonitrile, methacrylonitrile, acrylamide and derivatives thereof, methacrylamide and derivatives thereof, hydroxyethyl methacrylate and acrylate, hydroxypropyl methacrylate and acrylate, dimethylaminomethyl methacrylate and acrylate, dimethylaminoethyl methacrylate and acrylate, diethylaminomethyl methacrylate and acrylate, diethylaminoethyl methacrylate and acrylate, t-butylaminoethyl methacrylate and acrylate, allyl alcohol and derivatives thereof, cinnamic acid and derivatives thereof, styrene and derivatives thereof, methallyl alcohol and derivatives thereof, propargyl alcohol and derivatives thereof, indene and derivatives thereof, norbornene and derivatives thereof, vinyl ethers, vinyl esters and other vinyl derivatives, glycidyl methacrylate and acrylate, mono- and dimethyl maleate, mono- and diethyl maleate, mono-n-butyl maleate, mono-sec-butyl maleate, mono-ter-butyl maleate, monobenzyl maleate, mono-2ethylhexyl maleate, mono-n-octyl maleate, mono- and dimethyl fumarate and mono- and diethyl fumarate;

d. homopolymers of olefins such as butadiene, isoprene and isobutylene, and copolymers of these monomers with any of the monomers listed above consistent with the solvation limitation as described under (b);

e. terpolymers and tetrapolymers of the above;

f. polycarbonates, polyamides, polyurethanes and epoxies.

With the backbone, i.e., precursor, chosen, there are added on to this backbone polymeric chains of a different degree of polarity from that of the solvent so that these chains although grafted on or block polymerized to the solvated backbone, will themselves be non-solvated by the solvent system and, hence, form a dispersed phase. This addition of such chains is carried out via either a block or graft polymerization as just noted. Suitable monomers which form polymers that are too polar to be solvated by the OMS solvent medium are vinylacetate, methyl acrylate and methacrylate, ethyl acrylate and methacrylate, propyl acrylate and methacrylate, isopropyl acrylate and methacrylate, hydroxy ethyl acrylate and methacrylate, hydroxy propyl acrylate and methacrylate, acrylonitrile, methacrylonitrile, acrylamide, methacrylamide, acrylic acid and anhydride, methacrylic acid and anhydride, mono methyl maleate, mono ethyl maleate, mono-n-butyl maleate, mono-sec-butyl maleate, mono-ter-butyl maleate, monobenzyl maleate, mono-2-ethylhexyl maleate, mono-n-octyl maleate, mono methyl fumarate, mono ethyl fumarate, styrene, vinyl toluene, maleic acid and anhydride and crotonic acid and its anhydride. The invention is not limited to homopolymers in this further polymerization procedure; copolymers and terpolymers or polymers of greater degrees of complexity, but of the proper polarity, could be joined to the chosen solvated backbone structure to form the latex.

When a grafting procedure is chosen for the latex forming step, and there are no ethylenic or other unsaturated bonds available in the backbone for accepting the graft, polymeric chains can be grafted onto a saturated backbone, nevertheless, through the use of activating methods known to those skilled in the art. This method, however, although useful, leads to haphazard activation by the initiator employed of a site or sites in the backbone molecule which subsequenty serve to initiate the polymerization of the grafting monomer. A preferred method, rather than haphazard activation, is to construct the backbone molecule of the second liquid toner in such a way as to produce ethylenically unsaturated double bonds or other unsaturated bonds containing pendant moieties to serve as sites to be activated by the initiator for in situ graft polymerization. Thus, there may be employed an OMS solvated backbone molecule consisting of a copolymer of stearyl mathacrylate-glycidyl methacrylate of the proper (27:1) monomer ratio and molecular weight, e.g., 10,000 to 150,000. Methacrylic acid can be reacted with this polymer in the presence of a polymerization inhibitor to provide ethylenically unsaturated double bond containing sites through an esterification reaction for activation and subsequent in situ polymerization or copolymerization. In such a manner, precursors for a graft polymerization or copolymerization can be made. The term "precursor" as used herein denotes a backbone such as described, as well as a treated (activated) backbone, which is to be used as the base for reaction to form a latex.

Many different reactions can be utilized to introduce these ethylenically unsaturated double bond containing pendant groups into the precursor. If the monomer used in the backbone chain is called Monomer 1 (said monomer is at least one of two monomers which forms the backbone chain and which is present in a minority proportion by weight and which includes an unsaturated bond before copolymerization, said bond having been reacted in the formation of the copolymer but still contains a reactive group) and the additional monomer used to form the precursor is called Monomer 2 (the latter monomer is specificaly selected to be reactive with the reactive group of Monomer 1), the following are illustrative examples:

| Monomer 1 | Monomer 2 |
|---|---|
| Glycidyl methacrylate or acrylate | Acrylic acid<br>Methacrylic acid<br>Maleic acid<br>Fumaric acid<br>Atropic acid<br>Allylamine<br>Vinyl amine |
| Acryloyl or methacryloyl chloride | Hydroxyethyl methacrylate and acrylate<br>Hydroxypropyl methacrylate and acrylate<br>Acrylamide<br>Methacrylamide<br>Allyl alcohol<br>Allylamine<br>Vinyl amine |
| Acrylic acid<br>Methacrylic acid<br>Maleic acid<br>Crotonic acid<br>Alkyl hydrogen maleates<br>Aryl hydrogen maleates<br>Alkyl hydrogen fumarates | Vinyl pyridines<br>Glycidyl methacrylate<br>Vinylamine<br>Allylamine<br>Dialkylaminoalkyl methacrylates and acrylates |
| Vinyl isocyanate | Allylamine<br>Vinylamine<br>Methacrylyl acetone |
| Cyanomethylacrylate | Vinylamine<br>Allylamine |
| Vinyl β-chloroethylsulphone | Allylamine<br>Vinylamine<br>Allyl alcohol<br>Hydroxyalkyl methacrylates |
| Methacrylic anhydride<br>Acrylic anhydride<br>Maleic anhydride | Glycidyl methacrylate<br>Vinylamine<br>Allylamine<br>Hydroxyalkyl methacrylates<br>Allyl alcohol |
| Vinyl sulphonic acid<br>Vinyl phosphoric acid | N-hydroxymethyl methacrylamides<br>Alkoxymethyl methacrylamides |

The reverse reactions can also be utilized, i.e. Monomer 2 can be copolymerized into the backbone and subsequently condensed with Monomer 1 to create the precursor.

With the precursor formed, the latex is prepared by carrying out, in a liquid system wherein the percursor or additional fraction (moiety) is fully solvated and the other fraction (moiety) not fully solvated, the polymerization of the monomer or comonomers chosen for the additional fraction which preferably is the dispersed phase in the presence of and in conjunction with the precursor. In the preferred form of the second liquid toner, the monomer or monomers chosen polymerize to a material which is nonsolvated by the solvent system employed in the second liquid toner. For example, in an OMS-based system using the stearyl methacrylate-glycidyl methacrylate-methacrylic acid precursor, typical useful monomers for the additional fraction include methyl methacrylate, methyl acrylate, ethyl methacrylate, ethyl acrylate, isopropyl methacrylate, styrene, vinyl acetate, vinyl chloride, vinyl toluene, acrylonitrile and methacrylonitrile, as homopolymers or copolymers, or any one or more of the above with maleic anhydride, crotonic acid, acrylic acid, mono methyl maleate, mono ethyl maleate, mono-n-butyl maleate, mono-sec-butyl maleate, mono-ter-butyl maleate, monobenzyl maleate, mono-2-ethylhexyl maleate, mono-n-octyl maleate, mono methyl fumarate, mono ethyl fumarate, methacrylic acid, dimethylaminomethyl methacrylate, or terpolymers or tetrapolymers of any of the foregoing. When the polymerization is carried out, part of the monomer polymerizes with the precursor molecule (solvated backbone) to form a graft copolymer which is one form of complex tailored molecule for the second liquid toner, and this serves to stabilize any disperse polymer particles which are not grafted.

It will be appreciated that the dispersed phase which, in principle, is the non-solvated moiety of the complex amphipathic resin molecule, also may include dispersed non-grafted nonsolvated polymer particles. Although the latter are not particularly desirable by virtue of their non-solvation, they are aggregatable and, moreover, are able to behave electrophoretically to that they are capable of being selectively attracted to differentially electrostatically charged areas, whereby to form a graphic representation by electrostatography.

With a latex of the foregoing character constituting the complex tailored amphipathic resin molecule as thus far described, the fixative (substrate bonding) and dispersant functions are combined into a single molecule which will behave properly in an electrostatographic system. That is to say, this molecule, of which these are a great number in any particular second liquid toner, will be capable of charge direction and fixation and yet will not, because of the solvated moiety, tend to settle so that it has a "built-in" dispersing ability.

This complex tailored molecule, together with the solvent system, is capable, by itself, in conjunction with a charge director, of use as a second liquid toner because it need not form a visible selective deposition on a differentially electrostatically charged substrate, e.g. when used to deposit an image that will be used as a lithographic master. However, it is additionally desirable for the second liquid toner to contain a color ranging from black to white through all of the various hues. Phrased differently, it is desirable to color the suspended latex particles to that when they are preferentially attracted to differentially electrostatically charged regions of a substrate and deposited thereon, the film left by the deposit ("film" is here used in a sense not of a broad continuous layer but, rather, of a coating which may cover only a physically small portion of an area and may have any type of peripheral configuration depending upon the image that is to be produced) will likewise be colored so that they can be readily visible and also, if desired, so that a specific color can be created.

One way of imparting the color is by using either pigments or dyes added to the latex and physically dispersing them therein as by ball milling or high shear mixing.

The pigment employed in the second liquid toner can be any one of the many now known to the art in connection with liquid electrostatographic developers. As is well known, these pigments essentially constitute very fine solid particles the size of which is in the sub-micron range and which are opaque en masse. They are insoluble in the liquid system. Typical pigments are those listed hereinabove with respect to the first liquid toner.

When the dispersed phase is colored by pigment, such preferably are non-reactive with the amphipathic polymer of the second toner and with the constituents of the first liquid toner. It is believed that pigment particles are held to the non-solvated latex moiety by second order forces only, i.e., are thus held to the dispersed phase of the complex amphipathic resin molecule.

In another form of the second liquid toner pigments or dyes are employed which are chemically bonded to the latex, that is to say, which become chemically bonded to and are part of the complex molecule. The chemical bonding can be to the precursor before the graft or block polymerization of the added chains or it can be to the chains added by graft or block polymerization.

As to the dyes, as distinguished from pigments, these may be used to color the specific complex amphipathic resin polymer molecule of the second liquid toner and specifically to color the dispersed non-solvated phase thereof by being held thereto by second order or surface adsorption forces or the dyes can be chemically reacted with the complex tailored molecule, either after its formation, or to the precursor, or to the chain as it is being or after it has been grafted or block polymerized.

The dyes are incorporated in the second liquid toner by second order or surface adsorption forces, as by heating the latex and dye together for a sufficient time, for example, one to 12 hours. One type of example of such dyes is disperse dyes for dyeing polyester and copolymers of acrylonitrile and vinyl chloride where the dispersed phase is a polyester or a copolymer of acrylonitrile and vinyl chloride. Such dyes include: Latyl Orange 3R (DuPont) (C.I. Disperse Orange 26); Calcosperse Yellow GL (American Cyanamid) (C.I. Disperse Yellow 57); Calcosperse Blue B (American Cyanamid) (C.I. Disperse Blue 77); Foron Blue BGL (Sandoz Inc.) (C.I. Disperse Blue 73); Latyl Brown MS (DuPont) (C.I. Disperse Brown 2); and Latyl Violet BN (DuPont) (C.I. Violet 27). Other examples of such dyes are basic dyes for polyacrylics, where the dispersed phase is a polyacrylic. Typical of such dyes are: Sevron Blue BGL (Dupont) (C.I. Basic Violet 15); Deorlene Brilliant Red 3B (Ciba) (C.I. Basic Red 26); Calcozine Acrylic Blue G (American Cyanamid) (C.I. Basic Blue 38); Astrazon Yellow Brown GGL (Farbenfabriken Bayer) (C.I. Basic Orange 30); and Astrazon Red 5BL (Farbenfabriken Bayer) (C.I. Basic Red 24).

A better approach and one which is preferred in a more sophisticated form of the second liquid toner is to create a dispersed (non-solvated) phase of a copolymer containing reactive groups which will react with reactive groups of a chromophoric nature, for example, a dispersed phase of a copolymer containing basic groups which can be reacted with acid dyes. An example of a dispersed phase of a latex which can be used in the foregoing manner is a terpolymer of acrylonitrile, 2-methyl-5-vinyl pyridine and vinyl acetate. Such terpolymer can be reaction dyed with dyes containing acid groups of which examples are: Pontacyl Brilliant Blue A (Dupont) (C.I. Acid Blue 7); Calcocid Brilliant Blue FFR (American Cyanamid) (C.I. Acid Blue 104); Femazo Brown N (General Aniline) (C.I. Acid Brown 14); Crocein Scarlet N (DuPont) (C.I. Red 73); Oxanal Yellow I (Ciba) (C.I. Acid Yellow 63); and Benzyl Black 4BN (Ciba) (C.I. Black 26A).

Such a complex tailored molecule is tri-functional. It contains not only the dispersant and fixative functions but also the coloring functions. Such a second liquid toner has an essentially mono-dispersed phase, i.e., a small range of variation of particle size.

An alternate method of creating the more sophisticated complex tri-functional amphipathic resin molecule which embodies the aforesaid three functions of fixing, dispersing and coloring is to create a dispersed phase of a copolymer containing acid groups which then are reacted with basic dyes (instead of with the aforesaid acid dyes). An example of a dispersed phase of such a latex is a copolymer of vinyl acetate-maleic acid. This is dyeable with dyes containing basic groups of which examples are: Magenta (C.I. Solvent Red 41, C.I. No. 42510B), Crystal Violet (C.I. Solvent Violet 9, C.I. No. 42555B), Bismarck Brown (C.I. Solvent Brown 12, C.I. No. 21010B), Victoria Blue BA (C.I. Solvent Blue 4, C.I. No. 44045B), Victoria Blue R (C.I. Solvent Blue 6, C.I. No. 44040R), Victoria Blue 4R (C.I. Solvent Blue 2, C.I. No. 43563B), Copying Black SK (C.I. No. 11975), Janus Green B (C.I. No. 11050), Auramine O (C.I. Solvent Yellow 34, C.I. No. 41000B), Victoria Green (C.I. Solvent Green 1, C.I. No. 42000B), and Rhodamine (C.I. Solvent Red 49, C.I. No. 45170B).

Still another method of creating a tri-functional complex tailored amphipathic resin molecule for the second liquid toner by virtue of a chemical reaction for bonding the chromophore to the block or graft modified precursor is to create a dispersed phase of a copolymer containing electron acceptor groups, for example, maleic acid or crotonic acid which are Lewis acids and which are then reacted with color precursors that are well known to the art. An example of this latter tri-functional sophisticated complex molecule is a terpolymer of maleic anhydride-vinyl acetate-styrene (on a solvated backbone) and reacted with a color precursor such for instance as bis (p-dimethylaminophenyl)-benzotriazyl methane. A second liquid toner embodying the foregoing complex molecule will, per se, produce a deep blue colored deposit.

Where the pigment or dye is reacted with the added groups in the dispersed phase, the amount of pigment employed can fluctuate from as low as 5% to a theoretical 100% of the calculated stoichiometric amount in the second liquid toner. Nevertheless, it is preferred to have the amount of dye or pigment thus incorporated vary between about 10% and 50% of the stoichiometric amount, with best results having been obtained at about 25% of the stoichiometric figure.

There is yet another way for coloring latexes of the second liquid toners. This is to color the precursor itself, which is to say, the backbone that is the solvated phase rather than to color the dispersed unsolvated phase. Although there could be used for coloring the precursor some of the methods recited above to color the dispersed phase by chemical reaction or by second order bonds or surface adsorption or even by chemical reactions of chromophores with the precursor a highly preferred method is to employ a dye which is copolymerized into the precursor itself, that is to say, the solvated backbone, before the backbone is grafted or block polymerized with the non-solvated moieties (chains). An example of such a process is set forth below (EXAMPLE XVIII) along with many other examples of methods of manufacturing the complex amphipathic resin molecule of the second liquid toner.

It should be observed, moreover, that, if desired, both the dispersed phase and the solvated precursor can be dyed by any of the manners aove discussed in detail.

As thus far described, there has been provided a stable latex which constitutes practically all of the necessary ingredients of the second liquid toner, these including the liquid solvent system with the complex amphipathic resin molecule having solvated and non-solvated moieties and which is tri-functional as to the fixative, dispersant and colorant or includes a separate (non-reacted) color agent. It still is, nevertheless, extremely desirable to include in the second liquid toner a charge director or directors, the same adding greatly to the depth of color obtained and aiding in contrast. Hence, there preferably is included in the second liquid toner as a constituent over and above the solvent system, the complex molecule and a separate colorant, if one is not included as a moiety of the complex molecule, a charge director in a useful concentration. In electrostatograhic development a charge director present in a suitable concentration is to all intents and purposes a necessity. The charge director or directors chosen for the second liquid toners may be any of those mentioned with respect to the first liquid toner and, indeed, the same charge director or directors are preferably used for both the first and the second liquid toners which are mixed to form the hybrid liquid toner of the present invention.

The amounts of the different non-carrier constituents of the first and the second liquid toners are capable of extremely wide variation, indeed, so wide that assigning specific figures thereto of the extreme ranges which function satisfactorily in the hybrid toner is largely meaningless. For example, the amounts will vary with the type of machine, climate, machine speeds, types of paper and experience of the operator, to mention but a few. Also, particularly in the case of the coloring material, the amounts will vary with the intensity of the dye or pigment and the desired degree of intensity of the image. Generally speaking, moreover, the amounts of the individual non-carrier constituents will increase or decrease together, although not in strict proportion. Bearing all of this in mind and in order to assist workers in the art in the preparation of hybrid toners embodying the present invention, the following represent approximately maximum and minimum amounts of the various non-carrier constituents per liter of the first and second liquid toners in a working toner bath.

For the fixer of the first liquid toner from about 0.05 g. to about 5.0 gs.

For the dispersant of the first liquid toner from about 0.025 g. to about 5.0. gs.

For the pigment of the first liquid toner from about 0.025 g. to about 5.0 gs.

For the charge director of the first liquid toner from about 0.0005 g. to about 0.5 g.

For the complex amphipathic molecule of the second liquid toner where the same includes a dye or pigment either chemically reacted therewith or bonded thereto or affiliated therewith by surface adsorption forces from about 0.03 g. to about 30 g.

For the complex amphipathic molecule of the second liquid toner where the same does not include a color agent reacted or associated therewith from about 0.03 g. to about 30 g.

For the color agent of the second liquid toner where the same is not reacted or bound to the complex amphipathic molecule from about 0.03 g. to about 30 g.

For the charge director of the second liquid toner from about $1 \times 10^{-6}$ g. to about 10 g.

The balance of each toner constitutes the liquid carrier.

Examples of different specific embodiments of the second liquid toners follow:

The first nine examples are examples of precursors, i.e. examples of the formation of the backbone, that is to say, the spine, of the amphipathic molecule with which a subsequent reaction will later be described in further examples which deal with the formation of the latices from the precursors and toners from the latices.

EXAMPLE XI

In a clean dry 8 oz. glass jar is placed 100 gs. of 2-ethylhexyl-acrylate and 1 g. of AZBN (azobisisobutyronitrile), a polymerization initiator. The jar is placed in a water bath maintained at 75°±2° C. After about 30 minutes an exothermic polymerization takes place. The temperature reaches a maximum of 120° C. in about 5 minutes after the start of the exotherm. After it cools down to 90° C. the jar is removed from the water bath, loosely covered and placed in a hot air oven at 90° C. overnight to complete the polymerization. The product is a nearly water-white heavy syrup.

EXAMPLE XII

Four hundred grams of petroleum ether (b.p.90°–12° C) is placed in a 1 liter reaction flask equipped with a stirrer, a thermometer, a reflux condenser, and a dropping funnel and heated to a gentle reflux at atmospheric pressure. A solution of 1.2 g. AZBN in 200 g. of 2-ethylhexyl-acrylate and 6.9 g. of glycidyl methacrylate is placed in the dropping funnel and allowed to drip into the reflux stream at such a rate that the addition takes 3 hrs. The mixture is refluxed at atmospheric pressure for an additional 2 hrs. at which time 4 g. of acrylic acid, 0.14 g. of 2, 6-di-tertiary butylphenol and 1 g. of lauryl dimethyl amine is added. The mixture is reflued at atmospheric pressure for 12 more hours under a nitrogen blanket to esterify ca. 25% of the glycidyl rings of the copolymer. The product is a straw-colored somewhat viscous liquid.

EXAMPLE XIII

In a 500 ml. resin reactor equipped with a stirrer, a thermometer, a reflux condenser and a dropping funnel is placed 250 gms. of Isopar E. The solvent is heated to 93±1° C. and 250 gs. of 2-ethylhexyl acrylate containing 1.5 gs. of AZBN is added dropwise to the hot solvent over a period of 3 hrs. The mixture is maintained at 93±1° C. for 3 additional hours to complete polymerization. All reactions take place in the reactor at atmospheric pressure. The product is a slightly viscous straw-colored liquid.

EXAMPLE XIV

In a 1 liter reaction flask equipped with a stirrer, a thermometer and a reflux condenser is placed 400 gs. of petroleum ether (b.p. 90°–120° C.) and the same is then heated at atmospheric pressure to a moderate rate of reflux. A solution is made of 194 gs. lauryl methacrylate, 6.0 gs. of glycidyl methacrylate and 3.0 gs. of benzoyl peroxide paste (60% by wt. in dioctyl phthalate) and placed in a 250 ml. dropping funnel attached to the reflux condenser. The monomer mixture is allowed to drip into the refluxing solvent at such a rate that it requires 3 hrs. for the total amount to be added. After refluxing 40 minutes at atmospheric pressure beyond the final addition of monomer, 0.5 gs. of lauryl dimethyl amine is added and the refluxing is continued at atmospheric pressure for another hour. Then 0.1 g. hydroquinone and 3.0 gs. methacrylic acid are added and refluxing continued under a nitrogen blanket until ca. 52% esterification of the glycidyl groups is effected (about 16 hours). The resulting product is a slightly viscous straw-colored liquid.

EXAMPLE XV

EXAMPLE XIV is repeated except that final refluxing is concluded when ca. 25% esterification of the glycidyl groups has been effected.

EXAMPLE XVI

In a 5 liter jacketed glass reactor open to the atmosphere and equipped with a stirrer, a thermometer, a nitrogen bubbler and a reflux condenser is placed 2400 gs. of Isopar G. The solvent is heated to 110°± 1° C. by circulating hot triethylene glycol through the jacket. The temperature of the glycol is controlled by a proportional heating unit with its temperature sensor in a reservoir of the heating fluid from which the hot liquid is pumped to the reactor and subsequently returned to the reservoir for further heating. A three-way valve arrangement allows the glycol heating system to be isolated from the jacketed reactor so that cold water can be immediately supplied to the jacketed reactor to keep the temperature constant during the polymerization exotherm when necessary. When the solvent reaches the foregoing temperature, a mixture of 1035.7 gs. isodecyl methacrylate, 36.0 gs. glycidyl methacrylate and 18.0 gs. Luperco ANS-50 (a paste consisting of 50% benzoyl peroxide by weight in dioctyl phthalate) is added at a constant rate over a 3 hr. period through a dropping funnel attached to the condenser. After all of the monomer solution has been added, the reaction mixture is held at 110°± 1° C. for another 30 min. Then 3.0 gs. lauryl dimethyl amine is added and the reaction mixture again held at said temperature for 1 hr. At this point 0.6 gs. hydroquinone is added and the nitrogen bubbler is started to provide a nitrogen blanket during the esterification. Then 18.0 gs. of methacrylic acid is added and the reaction temperature is maintained until an acid drop indicates that 25% of the glycidyl rings have been esterified (ca. 8 hrs.). The product that results is a slightly viscous straw-colored liquid.

EXAMPLE XVII

Using the same apparatus as described in EXAMPLE XVI, 1400 gs. of Isopar G is warmed to 110°± 1° C. To this hot solvent, a solution of 1278.6 gs. stearyl methacrylate, 32.4 gs. glycidyl methacrylate, and 16.2 gs. Luperco ANS 50 in 720 gs. of Isopar G is added through a dropping funnel attached to the condenser over a 3 hr. period, the temperature being maintained at 110°± 1° C. After all of the monomer solution has been added, the reaction mixture is held at 110°± 1° C. for another 40 mins. Then 2.8 gs. lauryl dimethyl amine is added and the reaction mixture again held at said temperature for 1 hour. At this point 0.54 gs. hydroquinone is added and the nitrogen bubbler is started to provide a nitrogen blanket during the esterification. Then 16.2 gs. methacrylic acid is added and the reaction temperature is maintained until an acid drop indicates that 24% of the glycidyl rings have been esterified (ca. 7 hrs.). The product is a slightly viscous straw-colored liquid.

EXAMPLE XVIII

In a 500 ml. 3-neck round-bottom reaction flask open to the atmosphere and equipped with a stirrer, a thermometer, a thermocouple for a thermoregulator and a reflux condenser, is placed 197.8 g. Isopar G. The solvent is warmed to 110°± 1° C. with stirring. A mixture of 96.0 g. lauryl methacrylate, 3.0 g. glycidyl methacrylate, 0.74 gs. benzoyl peroxide (99%), 50 mls. of benzene and 5.0 gs. of p-phenylazoacrylanilide is prepared by stirring on a magnetic mixture for 30 minutes at room temperature. Most but not all of the p-phenylazoacrylanilide dissolves. This mixture is added in 5 ml. increments at 5 min. intervals over a period of 3 hrs. to the solvent in the flask. The mixture is kept well stirred so that each addition will be identical in composition. After the last addition, the mixture is allowed to react at 110°± 1° C. for 45 minutes and then 0.25 gs. lauryl diemthyl amine is added. After one more hour of reaction time, 0.05 g. hydroquinone is added and a nitrogen sparge is started. Then 1.49 g. methacrylic acid is added and the temperature of the reaction mixture is maintained at 110°± 1° C. until the drop in acid value indicates that 25% of the glycidyl rings have been esterified (ca. 6 hrs.). The batch is cooled to 50° C. and added slowly to 2700 mls. of methyl alcohol with continuous vigorous agitation. The precipitated polymer is allowed to settle for 24 hours and is recovered by decantation. The polymer is air-dried at room temperature for 48 hours and then for 4 hours at 50° C. This polymer is then dissolved in 300 gs. of Isopar G giving a deep clear orange solution to be used in latex production.

EXAMPLE XIX

In a 500 ml. resin reactor equipped with a stirrer, a thermometer, a reflux condenser open to the atmosphere, a nitrogen bubbler and a dropping funnel is placed 197.8 gs. Isopar K and warmed to 110°± 1° C. A mixture of 86.0 gs. lauryl methacrylate, 9.9 gs. N-1, 1, 3, 3-tetramethyl butyl methacrylamide, 2.97 gs. glycidyl methacrylate and 0.74 gs. benzoyl peroxide is placed in the dropping funnel and added to the hot solvent at a constant rate over a 3 hr. period, the temperature being maintained at 110°± 1° C. The polymerization is allowed to continue for 6 more hours after the last of the monomer mixture has been added (a sample of the mixture analyzed at this time reveals a 96.4% polymerization). Then 0.12 gs. lauryl dimethyl amine is added to the mixture and it is heated for another hour at which time 0.05 g. hydroquinone is added and a nitrogen sparge begins. Next 1.49 gs. methacrylic acid is added and the temperature of the mixture maintained at 110°± 1° C until a check of the acid content indicates that 25% of the glycidyl rings have been esterified (ca. 9 hrs.). The product is a somewhat viscous, straw-colored liquid.

LATICES

The following are examples of latices for the second liquid toner employing those of the foregoing precursors which yield better results.

EXAMPLE XX

In a 500 ml. resin reactor open to the atmosphere, and equipped with a stirrer, a thermometer and a reflux condensor, is placed 360 g. Isopar K, 185 gs. vinyl acetate, 30 gs. of the precursor prepared according to EXAMPLE XIV, 15 gs. methyl hydrogen maleate and 4 gs. AZBN. The temperature of the reaction mixture is raised to 85°± 2° C. and held there for 4 hours. An additional 2 gs. of AZBN is then added to the mixture and the polymerization is carried out for another 4 hours at °± 2° C. A thin blue white latex is obtained with a particle size of 0.04 to 0.2 microns.

EXAMPLE XXI

A mixture of 27.5 gs. of the precursor solution prepared according to EXAMPLE XV, 30 g. methyl methacrylate, 0.5 g. methacrylate acid and 0.4 g. AZBN is charged along with 134 g. petroleum ether (b.p. 60°-90° C.) and 29.5 g. Isopar G into a 500 ml. resin reactor open to the atmosphere and is gently refluxed for 20 minutes. Then 1.4 g. of a 10% solution by weight of n-octyl mercaptan in Isopar K is added to the reactor. A mixture of 166. g. methyl methacrylate, 3.4 g. methacrylic acid, 3.0 g. of the 10% solution of n-octyl mercaptan in Isopar K, and 0.4 g. AZBN is dripped at a constant rate into the stream of the gently refluxing condenser over a period of 2½ hours. Gentle reflux is continued for another ½ hour and the batch is then cooled to room temperature. The resulting product is a smooth, white, slightly viscous latex with a particle size of 0.4–1.0 microns.

EXAMPLE XXII

In a 2 liter 3-neck round-bottom flask open to the atmosphere and equipped with a stirrer, a thermometer, and a reflux condenser is placed 848.5 g. Isopar K, 70.7 g. of the precursor solution prepared according to EXAMPLE XVIII, 471.4 gs. vinyl acetate and 9.4 g. AZBN. The reaction mixture is heated with constant agitation to 86° C. and the temperature is maintained for 4 hours. The resulting product is a light lemon yellow latex with a particle size less tha 0.2 micron and a solids content of 31.7%.

EXAMPLE XXIII

A mixture to 18 g. of the precursor solution prepared according to EXAMPLE XV, 110 g. hydroxypropyl methacrylate, 3 g. AZBN and 200 g. Isopar K is placed into a 500 ml. resin reactor open to the atmosphere and heated with constant agitation. The exotherm beings at 78°–80° C. and the temperature rises to a maximum of 120° C. and then drops back to 80° C. Polymerization is complete in 30 minutes. A slight amount of over-size large particle material is removed by pouring the mixture through a 200 mesh nylon screen. A white latex of 0.5 micron particle size is obtained.

EXAMPLE XXIV

A solution of 15 g. of Bakelite Union Carbide poly (vinyl ethyl ether) (Vinylite EDBM, a poly(vinyl ethyl ether) with a reduced viscosity of 4.0°± 0.5 as determined by using 0.1 g. polymer in 100 mls. benzene at 20° C., sp.gr. 0.968 at 20° C.) in 285 g. of Isopar G is made in a 500 ml. resin reactor open to the atmosphere through a reflux condenser by shaving the resin into small particles and agitating it in the solvent at 90° C. for 20 hours. The solution is cooled to room temperature and 185 g. vinyl acetate and 2.0 g. benzoyl peroxide (99%) is added. The batch is heated until reflux occurs (ca. 95° C.) and the temperature is maintained for 4 hours. After 45 minutes of heating at said temperature, the solution becomes turbid. After 1 hr. 15 mins. of heating at said temperature the batch becomes so viscous that although the stirrer continues to run, no agitation is visible and the product appears to be a thick white cream. After 2 hours of heating at said temperature the batch begins to thin and at the end of 3 hours of such continued heating it thins to the consistency of heavy cream where it remains. At the end of the 4 hours, the dropwise addition of a solution of 1.5 g. lauroyl peroxide in 30 gs. Isopar G is begun and completed over a 3 hour period while the temperature of the system in maintained at 95°± 2+ C. The mixture is held at this temperature for 3 more hours after the last of the lauroyl peroxide solution has been added. The result is a white latex of 0.7–1.5 micron particle size.

EXAMPLE XXV

A mixture of 180 g. Isopar K, 100 gs. vinyl acetate, 15 gs. precursor solution prepared according to EXAMPLE XVI, and 2 gs. AZBN is placed in a 500 ml. reaction flask equipped with a thermometer, a stirrer, a reflux condenser and an internal cooling coil. The reacting mixture is heated to and maintained at 86°± 2° C. for 4 hours with continuous agitation. The flask is open to the atmosphere through the cooled reflux condenser. Occasionally it is necessary to cool the reacting mixture by running water through the cooling coil during the early stages of the reaction. The resulting product is a thin white to blue-white latex whose particles are too small to be viewed in an optical microscope. The latex contains 33% solids.

EXAMPLE XXVI

In a 5 liter jacketed glass reactor equipped with a thermometer, a stirrer, and a reflux condenser (the apparatus of EXAMPLE XVI) is placed 2160 gs. Isopar K, 180 gs. precursor prepared according to EXAMPLE XV, 1140 gs. vinyl acetate, 60 gs. N-vinyl-2-pyrrolidone and 24 gs AZBN. The reaction mixture is heated to and maintained at 86°±2° C. for 4 hours. The resulting product is a thin white to blue-white latex whose particles are too small to be viewed in an optical microscope.

EXAMPLE XXVII

In a 500 ml. resin reactor open to the atmosphere and equipped with a stirrer, a thermometer and a reflux condenser is places 360 gs. Isopar K, 190 gs. vinyl acetate, 30 gs. of the precursor prepared according to EXAMPLE XV, 10 gs. crotonic acid and 4 gs. AZBN. The temperature of the reaction mixture is raised to 86°± 2° C. and held there for 4 hours. An additional 2 gs of AZBN is then added to the mixture and the polymerization is carried out for another 4 hours at 85±2° C. A thin white latex is obtained.

EXAMPLE XXVIII

In a 500 ml. resin reactor open to the atmosphere and equipped with a stirrer, a thermometer, a thermoregulator, a reflux condenser and an internal cooling coil is placed 40 gs. Lube Oil Additive 564, 284 gs. Isopar K and 2.2 gs. benzoyl peroxide (99%). With continuous agitation, the batch is heated to 80° C. and maintained at that temperature for 2 hours. At this time a mixture of 10 gs. crotonic acid and 190 gs. vinyl acetate is added all at once to the reacted precursor which has become a dark amber. When the temperature of the reaction mixture has returned to 80° C., AZBN is added to the mixture in 0.5 g. increments at 10 min. intervals until a total of 4.6 gs. has been added (3 hrs. 40 min.). The reaction mixture is maintained at 80°±2° C. for 2 hours after the addition of the AZBN is complete. A white latex is obtained of 35.7% solids witha particle size <0.3 microns.

EXAMPLE XXIX

An example of a dyeing procedure for a latex in which it is believed that the dye does not react with the latex (although it is possible that it may be associated therewith by hydrogen bonding) is a mixture of 10% by weight Sudan Orange RA (Solvent Yellow 14, C.I. No. 12055) in Isopar K the same being ball milled for 4 hours. Twenty gs. of this dispersion is added to 100 gs. of the latex prepared according to EXAMPLE XXVII and the mixture is heated at 130°–135° F. for 8 hours with constant mechanical agitation. The mixture is filtered through a 200 mesh nylon cloth and allowed to cool to room temperature. A golden orange-colored latex is obtained.

SECOND LIQUID TONERS

The following are typical examples of second liquid toners in concentrated form employing some of the foregoing latices.

EXAMPLE XXX

One hundred gs. of the latex produced in EXAMPLE XXVIII is placed in a 500 ml. 3-neck round-bottom open top flask equipped with a stirrer, a reflux condenser and a thermometer, and 2 gs. of Victoria Blue Base BA (C.I. No. 44045B) is added to it. The temperature is raised to 80°± 5° C. and held there for 2 hours. The blue latex which results is cooled and filtered through a 200 mesh nylon cloth to remove residual dye. To this colored latex there is added 2.5 gs of a 1% by weight solution of aluminum 3,5-diisopropylsalicylate in Isopar K to form a toner concentrate. Four gs. of this dyed latex is diluted with 2000 mls. Isopar K to form a working toner bath. This latex is a complex molecule including in addition to the solvated and non-solvated moieties (in the liquid solvent system) a chromophore moiety. The charge director is a separate compound. When used by iteslf as a toner bath in a Dennison Standard Book Copier, blue prints are obtained.

EXAMPLE XXXI

To the batch of latex as prepared in EXAMPLE XXVII is added 13.65 gs. Victoria Blue Base BA and the temperature of the mixture is maintained at 85°± 2° C. for 3 hours. The dark blue latex is filtered through a 200 mesh nylon cloth and cooled to room temperature. To this colored latex there is added 25 gs. of a 1% solution of the aluminum salt of 3,5-di-t-butyl gamma resorcylic acid in Isopar G to form a toner concentrate. This toner concentrate likewise represents an example of a chromophoric moiety which is part of a complex amphipathic molecule. Four gs. of this concentrate is added to 2000 mls. Isopar G to form a working toner bath. This toner bath in a Dennison Standard Book Copier, gives intense, bright blue images.

EXAMPLE XXXII

To the batch of latex as prepared in EXAMPLE XX is added 6.8 gs. Auramine O and 6.8 gs. Rhodamine and the temperature of the mixture is maintained at 85°± 2° C. for 3 hours. The now bright yellow-orange latex is filtered through a 200 mesh nylon cloth and cooled to room temperature. To this colored latex there is added 10 gs. of a 1% solution of the aluminum salt of 3,5-di-butyl gamma resorcylic acid in Isopar G to form a toner concentrate. This toner concentrate likewise represents an example of a chromophoric moiety which is part of a complex amphipathic molecule. Ten gs. of this concentrate is added to 2000 mls. Isopar G to form a working toner bath. This mixture, when used by itself as a toner bath in a Scott 3D Copier, gives extremely bright orange images.

EXAMPLE XXXIII

To the bath of latex as prepared in EXAMPLE XX is added 13.65 gs. Victoria Green and the temperature of the mixture is maintained at 85°± 2° C. for 3 hours. The now dark bluish green latex is filtered through a 200 mesh nylon cloth and cooled to room temperature. To this colored latex there is added 40 gs. of a 1% solution of the aluminum salt of 3,5-di-t-butyl gamma resorcylic acid in Isopar G to form a toner concentrate. This toner concentrate likewise represents an example of a chromophore moiety which is part of a complex amphipathic molecule. Four gs. of this concentrate is added to 2000 mls. Isopar G to form a working toner bath. This mixture, when used by itself as a toner bath in a Dennison Standard Book Copier, gives intense, bright bluish green images.

EXAMPLE XXXIV

Three gs. of the latex prepared according to EXAMPLE XXV are ground together with 0.25 gs. of Raven 11 in a mortar and pestle, has added to it 30 drops of a 1% solution of the aluminum salt of 3,5-di-t-butyl gamma resorcylic acid and is thinned with a little Isopar K to form a toner concentrate. The concentrate is diluted to a volume of 2000 mls. with Isopar K to form a working toner bath. When this suspension is used by itself as a toner bath in a Dennison Standard Book Copier, good black prints are obtained.

EXAMPLE XXXV

To the batch of latex as prepared in EXAMPLE XXVII is added 13.65 gs. Crystal Violet (C.I. No. 42555B) and the temperature of the reaction mixture is maintained at $85°\pm 2°$ C. for 3 hours. The colored latex is filtered through a 200 mesh nylon cloth and cooled to room temperature. To this colored latex there is added 0.05 gs. aluminum dresinate to form a toner concentrate. This toner concentrate likewise represents an example of a chromophoric moiety which is part of the complex amphipathic molecule. Three gs. of this latex is added to 2000 mls. Isopar K to form a working toner bath. This bath, when used by itself in an A-M Sunbeam 500 Copier, gives very good violet prints.

EXAMPLE XXXVI

To the batch of latex as prepared in EXAMPLE XXVII is added 13.65 gs. Magenta (C.I. No. 42510B) and the temperature of the reaction mixture is maintained at $85°\pm 2°$ C. for 3 hours. The colored latex is filtered through a 200 mesh nylon cloth and cooled to room temperature. To this colored latex there is added 0.05 g. aluminum dresinate and 20 gs. of a 10% solution of Aerosol OT in Isopar K to form a toner concentrate. This toner concentrate likewise represents an example of a chromophoric moiety which is part of the complex amphipathic molecule. Three gs. of this latex is added to 2000 mls. Isopar G to form a working toner bath. When used by itself as a toner bath in a Dennison Standard Book Copier, magenta prints are obtained.

EXAMPLE XXXVII

Four gs. of the latex produced according to the EXAMPLE XXIX has added to it 20 drops of a 1% solution of aluminum diisopropyl salicylate in Isopar G to form a toner concentrate. Said concentration when diluted with 2000 mls. Isopar K forms a working toner bath. This mixture, when used by itself as a toner bath in a Dennison Standard Book Copier, gives yellowish-orange images.

All but one of the foregoing examples of second liquid toners have but a single color agent. Optionally, plural coloring agents may be used, and it is usually preferred to employ two or more coloring agents, the conjoint action of which is to produce a deep color such, for example, as a brown-black, blue-black or purple-black.

The preparation of the second liquid toner can be carried out in still another fashion, although it still involves, of course, the use of a multi-functional complex molecule having a moiety solvated by and a moiety unsolvated by the liquid solvent system; this is to form the amphipathic polymer molecule in a solvent in which such molecule is completely solvated and then by adding another solvent which is a non-solvent for a moiety of the polymer but is miscible with the first solvent, and desolvating this moiety of the amphipathic polymer molecule while said desolvated moiety remains bonded to the solvated moiety of the polymer, i.e., remains as a part of the polymer. If desired, all or a part of the first solvent can then be withdrawn. This is an extremely easy general way for obtaining a block amphipathic polymer as the dispersed phase in accordance with the present invention. As an example of the foregoing a block polymer of polyisoprene-polystyrene-polyisoprene is formed by anionic polymerization.

EXAMPLE XXXVIII 9.2 gs. of styrene are added to 60 cc. of tetrahydrofuran containing $3.3 \times 10^{-4}$ mole of sodium naphthalene (a catalyst) at $-80°$ C. in a three-neck round bottom flask equipped with a mechanical stirrer, a thermometer and a nitrogen inlet in a dry ice bath. The reaction is completed in 15 minutes, resulting in the formation of a "living" polystyrene polymer. Upon completion of polymerization 6.3 gs. of isoprene is added (still at $-80°$ C.) and the isoprene polymerizes on the living ends of the polystyrene to form a block polymer. The now living ends of this block polymer, which block polymer is solvated by the tetrahydrofuran, are then grafted on to a suitable backbone polymer as by reacting at room temperature with 3 gs. of the precursor solution of EXAMPLE XVIII to form the amphipathic polymer. Said backbone (precursor) polymer likewise is solvated by the tetrahydrofuran and such polymer is made the solvated phase of a non-solvent for the block polymer of the system. Thereby the block polymer moiety is desolvated. The non-solvent employed is OMS which is added at room temperature to the solvated poly (styrene/isoprene)/poly (lauryl methacrylate - glycidyl methacrylate - methacrylic acid - p-phenylazoacrylanilide) amphipathic polymer to form a latex. To this colored (golden-yellow) latex is added 2 gs. of a 1% solution of the aluminum salt of 3,5-di-t-butyl gamma resorcylic acid to form a toner concentrate. Fifteen gs. of the concentrate is diluted with 2000 mls. of OMS to form a working toner bath. When this toner is employed by itself as a toner bath in a Dennison Standard Book Copier good yellow prints are obtained.

EXAMPLE XXXIX

One hundred grams of the latex produced in EXAMPLE XXVII is placed in a 500 mls. 3-neck round bottom open top flask equipped with a stirrer, a reflux condenser and a thermometer, and 1.2 gs. of Victoria Green (C.I. No. 42000B), 2.4 gs. Bismarck Brown (C.I. No. 21010B) and 0.3 g. Rhodamine Base (C.I. No. 45170B) are added to it. The temperature is raised to $80°\pm 5°$ C. and held there for 2 hours. The black latex which results is cooled and filtered through a 200 mesh nylon cloth to remove residual dye. To this colored latex is added 5 mls. of aluminum dresinate solution, 10% by weight in Isopar H, to form a toner concentrate. To form a working toner bath, six grams of this concentrate is diluted with 2000 mls. Isopar H. When used by itself as a toner bath in a Dennison Standard Book Copier, dense black prints are obtained.

EXAMPLE XL

To one hundred grams of the latex prepared in EXAMPLE XXV is added 5 mls. of a 1% solution by weight of aluminum 3,5-diisopropylsalicylate in Isopar G to form a toner concentrate. To use this concentrate as a developer, 4 grs. thereof are added to 2000 mls. Isopar G. When tested in a copier, such as the Scott 3D, images are obtained which are shiny and visible by light reflected at an acute angle from the image.

To prepare a hybrid toner embodying the present invention either of two procedures preferably is employed. One is, as indicated previously, simply to mix together a previously prepared liquid toner and a previously prepared second liquid toner. Said liquid toners can be incorporated in the hybrid toner over a wide range of proportions varying from about 1/2% to 99.5% of either liquid toner with the remainder being the other liquid toner. Any suitable mixing equipment, either mechanical or manual, can be employed. The other method of preparation is to mix together with a suitable liquid carrier all of the various constituents which, if properly segregated, would form the first and second liquid toners.

At this time, it should be reiterated that the hybrid toner preferably utilizes a liquid carrier which is common to both the first and the second liquid toners, although this is not an absolute necessity, and if two separate solvent systems are employed they should be compatible. Moreover, preferably, although not necessarily, the same charge director(s) is (are) used for both toners. This makes it less likely that the two toners will be non-compatible and also simplifies procedure where the hybrid toner is made by directly mixing together all of the constituents thereof rather than by first preparing the first liquid toner and the second liquid toner separately and then mixing them together. In addition, it should be observed that certain charge directors, when used in combination, exert a synergistic effect. These have been found to be charge directors which are solvated in the solvent system. The synergism is not necessarily desirable inasmuch as the effect of the charge director peaks on the density vs. concentration of charge director curve and, therefore, because of the synergism the amounts of charge director, where two or more of these are employed, should be adjusted downwardly, such adjustment being within the skill of workers in the art and having to be selected differently for every mixture of such charge directors, and being further dependent upon the concentration and kinds of pigments and color agent employed. In the examples given subsequently where plural charge directors are given for a single hybrid toner, such adjustment to take synergistic effects into account always has been made.

There are other considerations which should be taken into account, to wit, that the amphipathic molecule (latex) of the second liquid toner is capable of functioning, at least in part, as a dispersant for the first liquid toner so that it is within the ambit of this invention to omit or reduce the amount of any other dispersant for the first liquid toner, said complex molecule being sufficient with certain other constituents of the first liquid toner to supply all or part of the necessary dispersing capability. The color agent of either of the two liquid toners can be omitted even if a visible developed image is required inasmuch as one color agent can suffice to supply the necessary visibility. However, it usually is desirable for both toners to contain color agent which, in the case of the amphipathic molecule, may be a moiety of the complex molecule. The same color agent can serve as the color agent for the two toners, e.g. as the color agent for the hybrid toner.

Set forth below in two sections are examples of hybrid toners embodying the present invention, the first section of examples constituting mixtures of the first toner and the second toner which are prepared by mixing together pre-prepared first and second liquid toners. The second section constitutes examples of hybrid toners prepared by mixing together the constituents desired to be present in the finished hybrid toner but without the previous preparation of the first and second liquid toners separately from one another.

The amounts of the different non-carrier constituents of the hybrid toners are, like those of the first and the second liquid toners, capable of so wide a variation that it is not meaningful to give any specific ranges. However, as a guide, the following represent approximately maximum and minimum amounts of the various non-carrier constituents per liter of liquid toner in a working hybrid toner bath.

For the fixer (as hereinbefore described) which is a separate chemical compound or composition (a chemical entity separate from the dispersant) from about 0.0025 g. to about 5 gs.

For the dispersant (as hereinbefore described) which is a chemical compound or composition that is chemically separate from the fixer from about 0.5 g. to about 5 gs. As to this dispersant it should be noted that it may embrace the amphipathic molecule alone or in combination with other dispersants.

For the color agent from about zero g. to about 1.0 g. It should be noted that the absence of color agent is not particularly desirable but is envisioned that no color agent be present in the hybrid toner when the same is used in the preparation of a lithographic master.

For the charge director from about $1 \times 10^{-6}$ g. to about 10 gs.

For the complex amphipathic molecule from about 0.05 g. to about 30 gs.

The balance of the hybrid toner constitutes the solvent system.

EXAMPLES OF HYBRID TONERS FORMED BY MIXING PREVIOUSLY FORMED FIRST AND SECOND LIQUID TONER CONCENTRATES AND DILUTING SAME

EXAMPLE XLI 4.5 gs. of the first liquid toner concentrate of EXAMPLE VIII and 0.5 g. of the second liquid toner concentrate of EXAMPLE XXX are added to 2000 mls. of Isopar G. The developer bath is either prepared manually and then added to a copying machine or the components thereof are added separately to the developing tray of a copying machine such as, e.g. the SCM 44 Copier and mixed by the action of the circulating pump. Black dense prints are obtained, free from background.

EXAMPLE XLII 0.5 g. of the first liquid toner concentrate of EXAMPLE VIII and 4.5 gs. of the second liquid toner concentrate of EXAMPLE XXX are added to 2000 mls. of Isopar G to form a working toner bath. When tested in the SCM 44 Copier, dense blue black prints are obtained.

EXAMPLE XLIII

In order to obtain a developer for use in the preparation of lithographic masters, add 8.0 gs. of the second liquid toner concentrate of EXAMPLE XXXIX and 0.04 g. of the first liquid toner concentrate of EXAMPLE IX to 2000 mls. Isopar G. This developer gives excellent results in an office copy machine, such as the Scott 3-D copier.

EXAMPLE XLIV

In order to obtain a developer for use in the preparation of microfiche images, add 4.0 gs. each of the first and second liquid toner concentrates mentioned in EXAMPLE XLIII to 2000 mls. Isopar G.

EXAMPLE XLV

The addition of 0.04 gs. of the first liquid toner concentrate of EXAMPLE X and 8.0 gs. of the second liquid toner concentrate of EXAMPLE XL to 2000 mls. of Isopar H gives a developer for the Toshiba BD-32 Copier which gives excellent lithographic masters.

EXAMPLES OF HYBRID TONERS FORMED BY MIXING CONSTITUENTS WITH A SOLVENT SYSTEM DIRECTLY WITHOUT THE INTERMEDIATE STEPS OF INDEPENDENTLY FORMING THE FIRST AND SECOND LIQUID TONERS

EXAMPLE XLVI

Ball mill the following ingredients together for 23 hours at 90° F.

| | | |
|---|---|---|
| 100 | gs. | Dymerex |
| 50 | gs. | Pliolite VTAC-L |
| 60 | gs. | Toner 8100 |
| 500 | gs. | Solvent 460 |

Then add 100 gs. Solvent 460 and ball mill at the same temperature for an additional hour. To 145 gs. of the foregoing add 60 gs. of the latex of EXAMPLE XXV (in addition to its functions as a major constituent of the second liquid toner component, this latex acts as a dispersent for the constituents of the first liquid toner component) and 0.75 g. of aluminum stearate and ball mill for 18 hours at 90° F. to form a hybrid toner concentrate. 5 gs. of the hybrid concentrate is diluted with 2000 mls. Isopar K to form a working hybrid toner bath which when used in a Dennison Mark I Book Copier produces dense black prints, free from background.

Although in this specific example, the two toner components are ball milled together at a somewhat elevated temperature, the majority of hybrid toners formed by blending of mixtures of first and second liquid toners are prepared by simple manual or automatic agitation means at ambient temperatures.

EXAMPLE XLVII

| | | |
|---|---|---|
| 20 | gs. | Dymerex |
| 10 | gs. | Pliolite VTAC-L |
| 8 | gs. | GAF Black M Toner |
| 120 | gs. | Solvent 460 |
| 1 | g. | Aluminum stearate |
| 30 | gs. | Latex of EXAMPLE XXV |

The above ingredients are ball milled at 90° F. for 18 hours to form a hybrid toner concentrate. To prepare the working hybrid toner bath, 5 gs. of hybrid toner concentrate is dispersed in 2000 mls. Isopar K. When used in a Dennison Mark I Book Copier, dense black prints are obtained free from background. Note that the latex also acts as a dispersant for the pigment and the charge director.

EXAMPLE XLVIII

| | | |
|---|---|---|
| 20 | gs. | Dymerex |
| 10 | gs. | Pliolite VTAC-L |
| 15 | gs. | GAF Black M Toner |
| 120 | gs. | Solvent 460 |
| 2 | gs. | Lube Oil 564 |
| 1 | g. | Aluminum stearate |

EXAMPLE XLVIII-continued

| | |
|---|---|
| 30 gs. | Latex of EXAMPLE XXV |

The above ingredients are ball milled at 90° F. for 18 hours to form a hybrid toner concentrate. When used at a concentration of 5 gs./2000 mls. Isopar G in a Savin 220 Copier, dense black prints are obtained, free from background.

EXAMPLE XLIX

| | | |
|---|---|---|
| 25 | gs. | Staybelite |
| 80 | gs. | Latex of EXAMPLE XXXIX |
| 12 | gs. | Toner 8100 |
| 3 | gs. | Spirit Nigrosine SSB |
| 6 | gs. | Raven 11 |
| 1 | g. | Aluminum stearate |
| 20 | gs. | Alkanol DOA |
| 50 | gs. | Isopar G |

The above formula is ball milled for 40 hours at ambient temperature to form a hybrid toner concentrate. When used in a Scott 3D Copier at a concentration of 4gs./2000 mls. Isopar G, dense black background-free prints are obtained.

EXAMPLE L

| | | |
|---|---|---|
| 25 | gs. | Staybelite |
| 6 | gs. | Latex of EXAMPLE XXXIX |
| 12 | gs. | Toner 8100 |
| 3 | gs. | Spirit Nigrosine SSB |
| 6 | gs. | Raven 11 |
| 2 | gs. | Aluminum stearate |
| 20 | gs. | Alkanol DOA |
| 50 | gs. | Isopar G |

The above formula is ball milled for 40 hours at ambient temperature to form a hybrid toner concentrate. When used in a Savin 200 Copier at a concentration of 6 gs./2000 mls. Isopar G, dense black background-free prints are obtained.

EXAMPLE LI

| | | |
|---|---|---|
| 25 | gs. | Staybelite |
| 80 | gs. | Latex of EXAMPLE XX dyed with Victoria Blue BA Base, 4% by weight |
| 8 | gs. | Toner 8100 |
| 2 | gs. | Spirit Nigrosine SSB |
| 4 | gs. | Statex B-12 |
| 10 | gs. | Alkanol DOA |
| 10 | gs. | Polymerized castor oil |

The above ingredients are ball milled at 98° F. for 39 hours. The output is cut with a mixture of:
0.75 g. Aluminum stearate
10 gs. Polymerized castor oil
50 gs. Isopar K
and ball milled for an additional hour to form a hybrid toner concentrate. When used at a concentration of 3 gs./2000 mls. Isopar K in a Dennison Mark I Book Copier, dense black background-free prints are obtained.

EXAMPLE LII

| | | |
|---|---|---|
| 950 | gs. | Latex of EXAMPLE XX dyed with Victoria Blue BA Base, 4% by weight |
| 20 | gs. | Staybelite |
| 8 | gs. | Toner 8100 |
| 2 | gs. | Spirit Nigrosine SSB |
| 4 | gs. | Raven 11 |
| 8 | gs. | Alkanol DOA |

EXAMPLE LII-continued

| 8 | gs. | Polymerized castor oil |

The above ingredients are ball milled at 100° F. for 40 hours. When used at a concentration of 25 gs./2000 mls. Isopar G with the addition of 10 drops of a 1% solution by weight in Isopar G of the aluminum salt of 3,5 diisopropylsalicylic acid, in a Toshibafax BD-32 Copier, excellent lithographic masters are produced.

With the use of the novel hybrid toner three unusual effects have been observed in connection with the preparation of developed images which are to be used as lithographic masters after etching.

The first of these concerns the "fill" which is the uniformity of electrostatographic deposit over a solid colored area in such a proportion that it is a reasonable facsimile of the original image densitywise. It will be recalled that, using the first liquid toner alone, the fill inwardly of the periphery of a colored zone of reasonably large size was poor. However, when even small amounts, e.g. as low as 1/2%, of the constituents of the second liquid toner are present in the hybrid liquid toner the fill is sharply bettered. The rate of improving the fill tapers off as larger amounts of the constituents of the second liquid toner are employed, and if this were the sole desideratum, it would be desirable not to include predominant amounts or even large amounts of the second liquid toner or its constituents in the hybrid liquid toner for economical reasons solely, inasmuch as the cost of the amphipathic molecule exceeds the cost of the fixer and dispersant of the first liquid toner. However, there are other considerations which will be mentioned below which govern the ratio of the constituents of the two liquid toners in the hybrid toner and it is observed that the use of larger amounts of the constituents of the second liquid toner in the hybrid toner do not lessen the effect of improvement in fill. Heretofore it has been proposed to use various types of mechanical approaches to the solution of this problem such, for instance, as the addition of development electrodes submerged in the bath and adjacent the path of travel of the immersed sheet carrier, but the results obtained thereby were largely unsatisfactory, and the fact that such small amounts of a second liquid toner in the hybrid toner so easily provides the desired fill was entirely unexpected. There is no explanation for such phenomenon, that is to say, the influence of the amphipathic molecule on the density of deposit of the pigment particles of the first liquid toner on an electrostatic latent image.

Another important improvement resulting from the combination of the two toners and, specifically, the addition of the constituents of the second liquid toner to the first liquid toner, is the lengthening of the life of the developed image when employed as a lithographic master. It has been found that, despite the short life of lithographic masters prepared with the first type of liquid toner, the life of a lithographic master prepared with the hybrid toner is very substantially greater and, indeed, at least as great as the life of the lithographic master prepared solely with the second liquid toner; in other words, the mixing together of the two liquid toners for the purpose of increasing fill does not degrade the life of the lithographic master prepared with the hybrid toner below the life of the lithographic master prepared with the second liquid toner alone so that, by this invention, both the fill and the length of life of a lithographic master can be bettered. In order to secure usable results insofar as the length of the life of a lithographic master is concerned, it is desirable to employ not less than about 1 part of the constituents of the second liquid toner to about 20 parts of the constituents of the first liquid toner. In connection with the foregoing it will be appreciated that these proportions may be adjusted depending upon the length of life desired and the cost factors involved; that is to say, if it is known that for a particular use a less than very lengthy life is required of a lithographic master, it would be a needless extravagance to use more of the constituents of the second liquid toner than will produce such an extended life.

An additional advantage observed by employing the constituents of both the first and the second liquid toners in a hybrid toner either for use in preparing a lithographic master or for general office copying purposes is that the presence of even small amounts of the constituents of the first liquid toner very substantially increases the edge contrast of a developed image, in other words, the sharpness or snappiness of the developed image. Such improvement in edge contrast is noticeable with even amounts as small as 1/2% of the constituents of the first liquid toner in the hybrid toner. However, again, the matter of economical considerations usually will preclude the employment of very large amounts of the constituents of the second liquid toner. Nevertheless, this increase in sharpness is not destroyed by using larger amounts of the constituents of the first liquid toner in the hybrid toner.

A further advantage has been observed which results from the presence of even small amounts of the constituents of the second liquid toner in the hybrid toner, this relating to the resistance of the deposited image to the etching solvent. It is characteristic of images deposited through employment of the first liquid toner that unless the original is extremely even in density the etch tends to attack lighter portions of the image and this results in portions of the image becoming less oleophilic than other portions so that the copies prepared with the lithographic master experience loss of quality in comparison with the original. But the addition of even very small amounts of the constituents of the second liquid toner overcomes this drawback and it will be observed that the developed images prepared with the hybrid toner have a substantial uniformity of resistance to transformation by the etching solution from the oleophilic state to the hydrophilic state. This effect is not decreased by the presence of larger amounts of the constituents of the second liquid toner in the hybrid toner.

The second special increased utility ensuing from the use of the hybrid toner concerns the electrostatographic preparation of microfiche images. Heretofore there has been no widely commercially acceptable toner for electrostatograhic creation of microfiche images. When the first liquid toner was employed it was subject to the aforementioned difficulty that the fixer had to be raised to such elevated temperature during fusing that it rendered the transparent thermoplastic carrier for the transparent photoconductor dimensionally unstable. This resulted in the running together or blurring of adjacent supposedly spaced portions of the reproduced image with such a high loss of resolution that such image had no commercial value. On the other hand, where the second liquid toner was employed the edges of image portions were not faithful reproductions of the corresponding edges of the original so that here, too, there was a tendency to lose resolution due to a wavering of the edges of the reproduction that was not present in the original. One other toner had been proposed for electrostatic creation of microfiche images, which toner required several minutes for setting after development. In the interim preceding hardening of the image, the toner could not be touched and this was an impractical approach under modern-day labor conditions and particularly where high speed reproductions were involved. All of these defects have been overcome when the first and second liquid toners are conjointly used in a hybrid toner. For an unexplainable reason or reasons the presence of the constituents of the first liquid toner has been found to cause the edge portions of the developed image to be faithful facsimiles of the edge portions of the original, this being true where even the minimal amounts above mentioned of the first liquid toner are employed. Conversely, the presence of even the minimal amounts of the second liquid toner have been found to enable the image to be fixed quickly and firmly at temperatures below those necessary for fixing the first liquid toner and below that which will render the thermoplastic transparent carrier for an organic transparent photoconductor dimensionally unstable. It is not known whether this decrease in setting temperature is due to a lower fusing point for the fixative moiety of the amphipathic molecule or to the ability of the amphipathic molecule to form a solvent-induced bond with the aforesaid thermoplastic carrier, or for some other reason not known, but, be that as it may, the physical result is present and for the first time enables a microfiche image to be created speedily and at a low enough temperature not to affect resolution so that the resolution capability of the final electrostatographically produced image will be a function solely of the resolution obtainable with the original at the optical reduction ratio employed and will in no wise be deleteriously affected by the reproduction process.

It thus will be seen that there is provided a system which achieves the various objects of the invention and which is well adapted to meet the conditions of practical use.

As various possible embodiments might be made of the above invention, and as various changes might be made in the embodiments above set forth, it is to be understood that all matter herein described is to be interpreted as illustrative and not in a limiting sense.

Having thus described the invention, there is claimed as new and desired to be secured by Letters Patents:

1. In a method of creating an image, the improvement comprising: applying under electrostatic control to a substrate so as to selectively deposit a coating thereon, a liquid electrostatographic toner essentially comprising a combination of:
   A. a first liquid toner including
      i. a solvent system having an evaporation rate at least as fast as that of kerosene, but slower than that of hexane, and a Kauributanol number less than 35, is substantially aromatic-liquid-free, has an electrical resistivity of at least about $10^9$ ohm centimeters, a dielectric constant of less than three and one half and a Tagliabue closed cup flash point of at least 100° F, is non-toxic and non-polar, has no objectionable odor, and has a viscosity of between 0.5 and 2.5 centipoises at room temperature,
      ii. a solid synthetic thermoplastic fixer fully soluble in the solvent system and
      iii. a dispersant;
   B. a second liquid toner including
      i. a solvent system compatible with the first liquid toner and which has an evaporation rate at least as fast as that of kerosene, but slower than that of hexane, and a Kauri-butanol number less than 35, is substantially aromatic-liquid-free, has an electrical resistivity of at least about $10^9$ ohm centimeters, a dielectric constant of less than three and one half and a Tagliabue closed cup flash point of at least 100° F, is non-toxic and non-polar, has no objectionable odor, and has a viscosity of between 0.5 and 2.5 centipoises at room temperature,
      ii. an amphipathic polymeric molecule of the graft type having a polymeric backbone part and a polymeric graft part on said backbone part, said molecule being composed of two moieties of which at least one is thermoplastic, said first moiety, which is one of said parts, being solvated by said systems, a portion of said first moiety being a fixative and a dispersant, and a second moiety, which is the other of said parts, being insoluble in said systems, said second moiety having a particle size between 25 m$\mu$ and 25$\mu$, a portion of said second moiety being a fixative, so that there is provided a continuous phase constituting the solvent systems with the first moiety dissolved therein and a dispersed phase constituting the non-solvated moiety whereby said molecule acts as a mono-dispersed particle phase, a fixative and a dispersant;
   C. the first liquid toner being present in an amount of from 0.5% to 99.5%, the balance of the liquid electrostatographic toner being the second liquid toner; and
   D. at least one of said liquid toners including a charge director.

2. In a method of creating an image, the improvement comprising: applying on a substrate an electrostatic charge in the configuration of an electrostatic latent image and thereafter applying to said substrate over the area of said latent image to selectively deposit a coating thereon a liquid electrostatographic toner essentially comprising a combination of:
   A. a first liquid toner including
      i. a solvent system having an evaporation rate at least as fast as that kerosene, but slower than that of hexane, and a Kauributanol number less than 35, is substantially aromatic-liquid-free, has an electrical resistivity of at least about $10^9$ ohm centimeters, a dielectric constant of less than three and one half and a Tagliabue closed cup flash point of at least 100° F, is non-toxic and non-polar, has no objectionable odor, and has a viscosity of between 0.5 and 2.5 centipoises at room temperature,
      ii. a solid synthetic thermoplastic fixer fully soluble in the solvent system and
      iii. a dispersant;
   B. a second liquid toner including
      i. a solvent system compatible with the first liquid toner and which has an evaporation rate at least as fast as that of kerosene, but slower than that of hexane, and a Kauri-butanol number less than 35, is substantially aromatic-liquid-free, has an electrical resistivity of at least about $10^9$ ohm centimeters, a dielectric constant of less than three and one half and a Tagliabue closed cup flash point of at least 100° F, is non-toxic and non-polar, has no objectionable odor, and has a viscosity of between 0.5 and 2.5 centipoises at room temperature, ii. an amphipathic polymeric molecule of the graft type having a polymeric backbone part and a polymeric graft part on said backbone part, said molecule being composed of two moieties of which at least one is thermoplastic, said first moiety, which is one of said parts being solvated by said systems, a portion of said first moiety being a fixative and a dispersant, and a second moiety, which is the other of said parts, being insoluble in said systems, said second moiety having a particle size between 25 m$\mu$ and 25$\mu$, a portion of said second moiety being a fixative, so that there is provided a continuous phase constituting the solvent systems with the first moiety dissolved therein and a dispersed phase constituting the non-solvated moiety whereby said molecule acts as a mono-dispersed particle phase, a fixative and a dispersant;

C. the first liquid toner being present in an amount of from 0.5% to 99.5%, the balance of the liquid electrostatographic toner being the second liquid toner; and D. at least one of the said liquid toners including a charge director.

3. A method as set forth in claim 2 wherein the second liquid toner further includes a color agent.

4. A method as set forth in claim 3 wherein the color agent is a moiety of the amphipathic molecule.

5. A method as set forth in claim 3 wherein the color agent is a compound other than the amphipathic molecule.

6. A method as set forth in claim 2 wherein the amphipathic molecule includes a solvated moiety selected from the group consisting of: crepe rubber; refined linseed oil, degraded rubber; alkyd resins; polyisobutylene; polybutadiene; polyisoprene, polyisobornyl methacrylate; homopolymeric vinyl esters of long chain fatty acids; homopolymeric vinyl alkyl ethers; homopolymers of the $C_4$–$C_{22}$ alkyl esters of acrylic and methacrylic acid in a molecular weight range of about $10^3$ to about $10^6$; copolymers of the aforesaid $C_4$–$C_{22}$ alkyl esters with one another; copolymers of the aforesaid $C_4$–$C_{22}$ alkyl esters with one another and with methyl, ethyl, isopropyl and propyl esters of acrylic and methacrylic acids; copolymers of the $C_4$–$C_{22}$ alkyl esters of acrylic and methacrylic acids with monomers containing acrylic acid, methacrylic acid, crotonic acid, maleic acid, atropic acid, fumaric acid, itaconic acid, citraconic acid, acrylic anhydride, methacrylic anhydride, maleic anhydride, acryloyl chloride, methacryloyl chloride, acrylonitrile, methacrylonitrile, N-vinyl pyrrolidone, acrylamide and derivatives thereof, methacrylamide and derivatives thereof, hydroxyethyl methacrylate, hydroxyethyl acrylate, hydroxypropyl methacrylate, hydroxypropyl acrylate, dimethylaminomethyl methacrylate, dimethylaminomethyl acrylate, dimethylaminoethyl methacrylate, dimethylaminoethyl acrylate, diethylaminomethyl methacrylate, diethylaminomethyl acrylate, diethylaminoethyl methacrylate, diethylaminoethyl acrylate, t-butylaminoethyl methacrylate, t-butylaminoethyl acrylate, cyclohexyl acrylate, allyl alcohol and derivatives thereof, cinnamic acid and derivatives thereof, styrene and derivatives thereof, butadiene, methallyl alcohol and derivatives thereof, propargyl alcohol and derivatives thereof, indene and derivatives thereof, norbornene and derivatives thereof, vinyl ethers, vinyl esters, vinyl derivatives other than vinyl ethers and vinyl esters, glycidyl methacrylate and acrylate, mono- and dimethyl maleate, mono- and diethyl maleate, mono-n-butyl maleate, mono-sec-butyl maleate, mono-ter-butyl maleate, monobenzyl maleate, mono-2-ethylhexyl maleate, mono-n-octyl maleate, mono- and dimethyl fumarate and mono- and diethyl fumarate; condensation polymers; copolymers of butadiene, isoprene and isobutylene with $C_4$–$C_{22}$ alkyl esters of acrylic and methacrylic acids; polycarbonates; polyamides; polyurethanes and epoxies, and the nonsolvated moiety comprises homopolymers and copolymers formed from monomers selected from the group consisting of vinyl acetate, vinyl chloride, methyl acrylate, methyl methacrylate, ethyl acrylate, ethyl methacrylate, propyl acrylate, propyl methacrylate, isopropyl acrylate, isopropyl methacrylate, hydroxy ethyl acrylate, hydroxy ethyl methacrylate, hydroxy propyl acrylate, hydroxy propyl methacrylate, acrylonitrile, methacrylonitrile, acrylamide, methacrylamide, acrylic acid, acrylic anhydride, methacrylic acid, methacrylic anhydride, mono methyl maleate, mono ethyl maleate, mono-n-butyl maleate, mono-sec-butyl maleate, mono-ter-butyl maleate, mono-2-ethylhexyl maleate, mono-n-octyl maleate, mono methyl fumarate, mono-ethyl fumarate, styrene, vinyl toluene, maleic acid, maleic anhydride, crotonic acid, crotonic anhydride, fumaric acid, atropic acid, allylamine, vinyl amine, allyl alcohol, vinyl pyridines and derivatives thereof, glycidyl acrylate, glycidyl methacrylate, dialkylaminoalkyl methacrylate, dialkylaminoalkyl acrylate, methacrylyl acetone, N-hydroxymethyl methacrylamides, alkoxymethyl methacrylamides, acryloyl chloride, methacryloyl chloride, vinyl isocyanate, cyanomethylacrylate, vinyl $\beta$-chloroethylsulphone, vinyl sulphonic acid, monobenzyl maleate and vinyl phosphoric acid.

7. A method as set forth in claim 2 wherein the amphipathic molecule includes a backbone chain of comonomers and attached chains having attached sites of a precursor monomer derived from monomers selected from the affiliated monomer groups set forth below:

| Comonomer of backbone chain | | Attached site precursor monomer (one or more non-mutually reactive radicals to be selected from each group) |
|---|---|---|
| Glycidyl methacrylate or acrylate | — | Acrylic acid<br>Methacrylic acid<br>Maleic acid<br>Fumaric acid<br>Atropic acid<br>Allylamine<br>Vinyl amine |

-continued

| Comonomer of backbone chain | | Attached site precursor monomer (one or more non-mutually reactive radicals to be selected from each group) |
|---|---|---|
| Acryloyl or methacryloyl chloride | — | Hydroxylethyl methacrylate and acrylate<br>Hydroxypropyl methacrylate and acrylate<br>Acrylamide<br>Methacrylamide<br>Allyl alcohol<br>Allylamine<br>Vinyl amine |
| Acrylic acid<br>Methacrylic acid<br>Maleic acid<br>Crotonic acid<br>Alkyl hydrogen maleates<br>Alkyl hydrogen fumarates | — | Vinyl pyridines<br>Glycidyl methacrylate<br>Vinylamine<br>Allylamine<br>Dialkylaminoalkyl methacrylates and acrylates |
| Vinyl isocyanate | — | Allylamine<br>Vinylamine<br>Methacrylyl acetone |
| Cyanomethylacrylate | — | Vinylamine<br>Allylamine |
| Vinyl β-chloroethylsulphone | — | Allylamine<br>Vinylamine<br>Allyl alcohol<br>Hydroxyalkyl methacrylates |
| Methacrylic anhydride<br>Acrylic anhydride<br>Maleic anhydride | — | Glycidyl methacrylate<br>Vinylamine<br>Allylamine<br>Hydroxyalkyl methacrylates<br>Allyl alcohol |
| Vinyl sulphonic acid<br>Vinyl phosphoric acid | — | N-hydroxymethyl methacrylamides<br>Alkoxymethyl methacrylamides. |

8. A method as set forth in claim 2 wherein the charge director is selected from the group consisting of: di-2-ethylhexyl sodium sulfosuccinate; di-tridecyl sodium sulfosuccinate; aluminum, chromium, zinc and calcium salts of 3,5-dialkylsalicylic acid, wherein the alkyl group is propyl, isopropyl, butyl, isobutyl, tertiary butyl, amyl, isoamyl and other alkyl groups up to C-18; aluminum, chromium, zinc and calcium salts of dialkyl gamma-resorcylic acid, wherein the alkyl is as above; isopropylamine salt of dodecylbenzene sulfonic acid; aluminum, vanadium and tin dresinates; cobalt, iron, lithium, tin and manganese octoates; a partially imidized polyamine with lubricating-oil soluble polyisobutylene chains and free secondary amines, gravity at 60° F. API 22.9, specific 0.92, flash point by the Cleveland open cup method, 425° F., viscosity at 210° F., 400 SSU, color (ASTM D-15001500) L55D, nitrogen percentage by weight 2.0, and alkalinity value, (SM-20-5-15) 43; soya bean lecithin; aluminum salt of 50—50 by weight mixture of the mono- and di-2 ethylhexyl esters of phosphoric acid; zinc, lead, copper, cadmium, calcium, aluminum and iron stearates; zinc and aluminum palmitates; aluminum oleate; copper, manganese, cobalt and lead linoleates; manganese linoresinate; and 1-[2-hydroxyethyl]-2-[mixed pentadecyl and heptadecyl]-2-imidazoline.

9. A method as set forth in claim 2 wherein the solid synthetic thermoplastic fixer is selected from the group consisting of: polymerized and hydrogenated thermoplastic acidic wood rosin, glycerol ester of modified wood rosin, pentaerythritol ester of wood rosin, pentaerythritol ester of polymerized wood rosin, modified pentaerythritol ester of wood rosin, pentaerythritol ester of hydrogenated wood rosin, pentaerythritol ester of dimeric resin acids, modified pentaerythritol ester of wood rosin, glycerol ester of polymerized wood rosin, a thermoplastic petroleum hydrocarbon resin in which the units of the polymer are predominantly selected from the group consisting of aromatic and cyclic units, having an acid number of less than 1 and a softening point of 100° C by the ring and ball method, fully hydrogenated glycerol ester of wood rosin, internally plasticized pentaerythritol ester of wood rosin, dimeric resin acids, a vinyl toluene/acrylate copolymer, and a vinyl toluene/n-butyl methacrylate/stearyl methacrylate polymer.

* * * * *